(12) United States Patent
Soejima et al.

(10) Patent No.: US 10,802,771 B2
(45) Date of Patent: Oct. 13, 2020

(54) INFORMATION PROCESSING APPARATUS, IMAGE CONTROL METHOD AND NON-TRANSITORY COMPUTER-READABLE RECORDING MEDIUM ENCODED WITH IMAGE CONTROL PROGRAM

(71) Applicant: Konica Minolta, Inc., Tokyo (JP)

(72) Inventors: Hideaki Soejima, Amagasaki (JP); Hisashi Uchida, Kyoto (JP); Hiroaki Kubo, Muko (JP); Tomoaki Nakajima, Kobe (JP); Yasutaka Ito, Amagasaki (JP); Yoshiaki Shibuta, Itami (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/179,334

(22) Filed: Nov. 2, 2018

(65) Prior Publication Data
US 2019/0146720 A1    May 16, 2019

(30) Foreign Application Priority Data

Nov. 14, 2017  (JP) ................. 2017-219123

(51) Int. Cl.
*G06T 7/00* (2017.01)
*G01N 21/896* (2006.01)
*G06F 3/12* (2006.01)

(52) U.S. Cl.
CPC ............ *G06F 3/121* (2013.01); *G06F 3/1208* (2013.01); *G06F 3/1286* (2013.01); *G06T 7/001* (2013.01); *G06F 3/1234* (2013.01); *G06T 2207/30108* (2013.01)

(58) Field of Classification Search
USPC ................ 345/616–618; 358/1.1–3.29, 501, 358/517–540; 713/1, 151–186; 714/100, 714/1–6.32, 15–26, 33–57
See application file for complete search history.

(56) References Cited

U.S. PATENT DOCUMENTS

| 7,616,340 | B2 * | 11/2009 | Yamazaki | G06K 15/02 347/14 |
| 2009/0027723 | A1 * | 1/2009 | Arai | G06F 3/1204 358/1.15 |
| 2009/0113236 | A1 * | 4/2009 | Kubota | G06F 11/2082 714/6.12 |
| 2009/0138766 | A1 * | 5/2009 | Rui | G06F 11/0748 714/57 |
| 2015/0269719 | A1 * | 9/2015 | Kitai | G06T 7/0002 358/474 |
| 2017/0109667 | A1 * | 4/2017 | Marcu | G06Q 10/067 |

FOREIGN PATENT DOCUMENTS

JP    2012-51296 A    3/2012

* cited by examiner

*Primary Examiner* — Marcellus J Augustin
(74) *Attorney, Agent, or Firm* — Osha Liang LLP

(57) ABSTRACT

An information processing apparatus includes a hardware processor that: detects a defect that occurs when an image processor performs an image process on process data; produces verification data when the defect is detected during the image process, wherein the verification data is formed in a case that at least one portion of the process data, to be processed by the image processor, is changed and causes a same defect that occurs during the image process on the process data; and externally outputs the verification data instead of the process data.

15 Claims, 17 Drawing Sheets

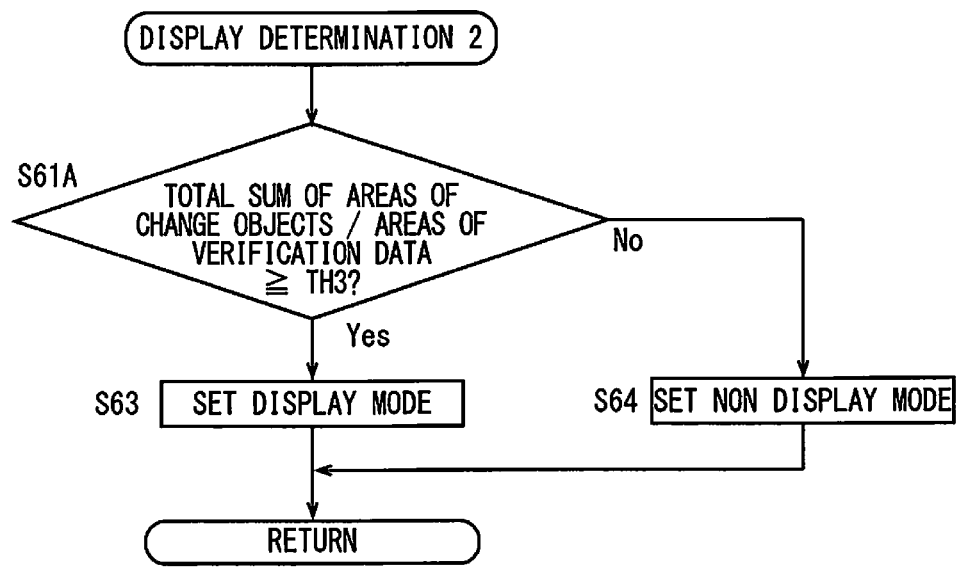
F I G. 1 1

INFORMATION PROCESSING APPARATUS, IMAGE CONTROL METHOD AND NON-TRANSITORY COMPUTER-READABLE RECORDING MEDIUM ENCODED WITH IMAGE CONTROL PROGRAM

CROSS-REFERENCE TO RELATED APPLICATIONS

Japanese Patent Application No. 2017-219123 filed on Nov. 14, 2017, is incorporated herein by reference in its entirety.

BACKGROUND

Technological Field

The present invention relates to an information processing apparatus, an image control method and an image control program. More specifically, the present invention relates to an information processing apparatus that processes images, an image control method performed in the information processing apparatus and a non-transitory computer-readable recording medium encoded with an image control program which allows a computer to perform the image control method.

Description of the Related Art

In recent years, an image forming apparatus represented by a Multiple Function Peripheral (hereinafter referred to as an "MFP") includes a function for processing images, and an error may occur during the image process. In this case, it is necessary to make settings of the image forming apparatus or repair the image forming apparatus in order to prevent a re-occurrence of the error. In a repair work of this image forming apparatus, it may be necessary to reproduce the error in the image forming apparatus in order to specify the cause of the error, and the data that is processed in the image process is required. On the other hand, a contractor who is not the user using the image forming apparatus may be in charge of making settings of the image forming apparatus or repairing the image forming apparatus. The outside contractor is the manufacturer that has manufactured the image forming apparatus or the company that is in charge of maintenance of the image forming apparatus, for example. Thus, in the case where the data that is required for reproduction of the error in the image forming apparatus includes confidential information, confidential information leaks.

For example, Japanese Patent Laid-Open No. 2012-51296 discloses an image forming apparatus that includes an image data converter converting print data into print image data in a print device printing and outputting the print data received from a device in an upper level, characterized in that the image data converter has a character data replacer, the image data converter determines whether a replacement mode of the character data is designated, and in the case where the replacement mode is set, produces a random character code by a random number using the character data replacer, and produces print image data by character font data corresponding to the produced character code.

SUMMARY

In the image forming apparatus described in Japanese Patent Laid-Open No. 2012-51296, the character data is replaced with the character font data corresponding to the random character code produced by random numbers, so that the data that does not include the confidential information included in the characters can be produced. However, in the case where confidential information is included in the information other than the characters, leakage of the confidential information cannot be prevented. Further, in the case where the cause of an error that has occurred in the image forming apparatus is the character font data corresponding to the random character code, the error that has occurred in the image forming apparatus cannot be reproduced.

According to one or more embodiments of the present invention, an information processing apparatus includes a hardware processor that detects a defect that occurs when an image processor performs an image process on data, in the case where the defect is detected during the image process, produces verification data, which is formed when at least one portion of the process data to be processed by the image processor is changed and causes a same defect as the defect that occurs in the case where the image processor performs the image process on the process data, and externally outputs the verification data instead of the process data.

According to one or more embodiments of the present invention, an image control method includes detecting a defect that occurs when an image processor performs an image process on data, in the case where the defect is detected during the image process, producing verification data, which is formed when at least one portion of the process data to be processed by the image processor is changed and causes a same defect as the defect that occurs in the case where the image processor performs the image process on the process data, and externally outputting the verification data instead of the process data.

According to one or more embodiments of the present invention, a non-transitory computer-readable recording medium is encoded with a device setting program, the device setting program allowing a computer to detect a defect that occurs when an image processor performs an image process on data, in the case where the defect is detected during the image process, produce verification data, which is formed when at least one portion of the process data to be processed by the image processor is changed and causes a same defect as the defect that occurs in the case where the image processor performs the image process on the process data, and externally output the verification data instead of the process data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 11 is a flow chart showing one example of a flow of a display determination process in the modified example;

DETAILED DESCRIPTION

Figure 1:
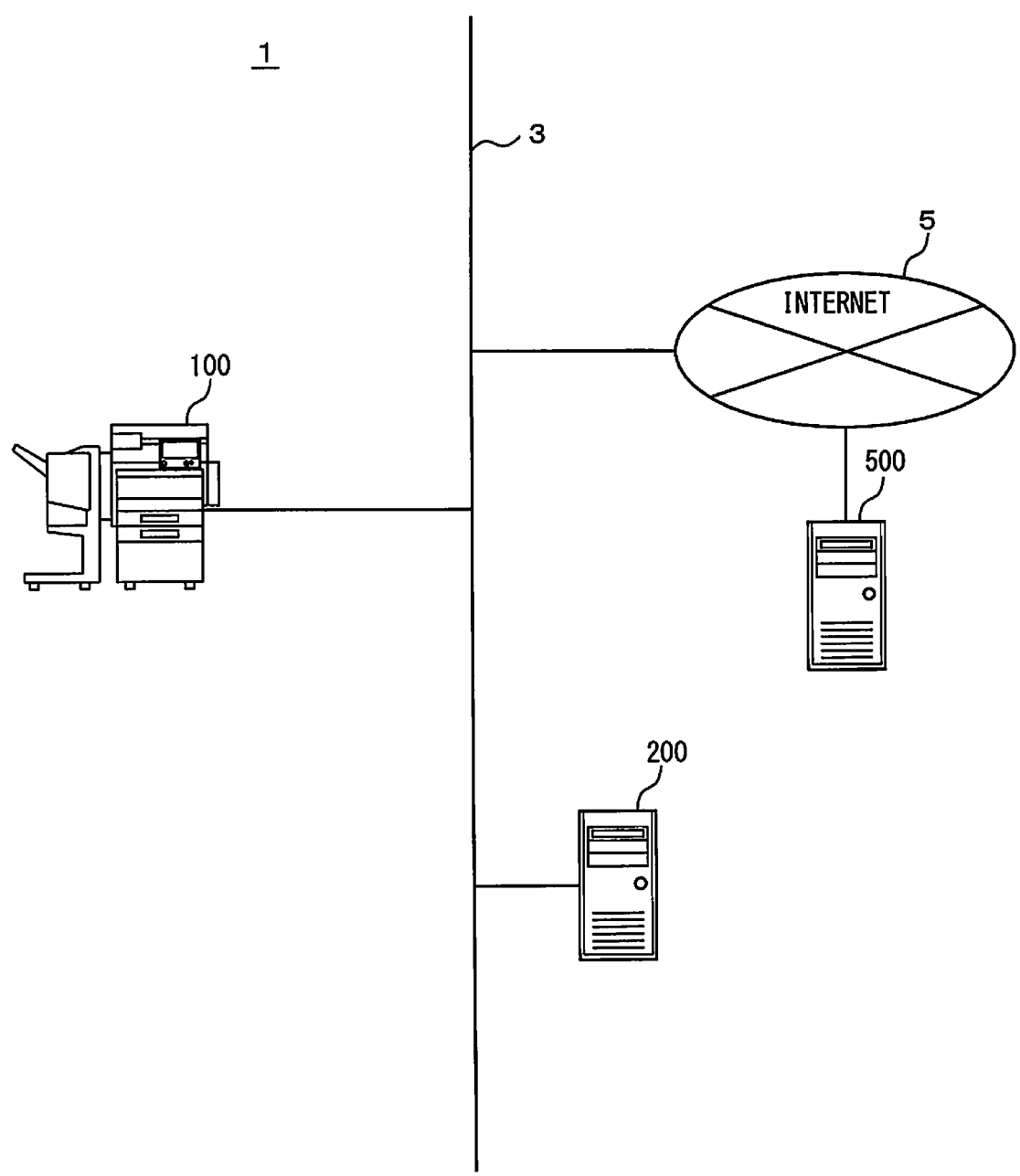
FIG. 1 is a diagram showing one example of an overview of an information processing system in one or more embodiments of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing one example of an overview of an information processing system in one or more embodiments of the present invention. Referring to FIG. 1, the information processing system 1 includes an MFP (Multi Function Peripheral) 100, an internal server 200 and a verification server 500.

The MFP 100 is one example of an information forming apparatus, and includes at least an image process function of performing an image process on the data to be processed and an image forming function of forming an image on a recording medium such as a paper (a sheet of paper) based on image data. In addition to the image process function and the image forming function, the MFP 100 may include a document scanning function of scanning a document and a facsimile transmission reception function of transmitting and receiving facsimile data. The image process includes a rasterization process of converting object data constituted by a plurality of objects into image data constituted by a plurality of pixel values and a conversion process of converting image data into object data. While the image process is not particularly restricted, it may be a sharpening process of emphasizing edges in an image or a smoothing process of smoothing gradation of color in an image.

The internal server 200 and the verification server 500 are general computers. The internal server 200 and the MFP 100 are respectively connected to a Local Area Network (LAN) 3. The verification server 500 is connected to the Internet 5.

The MFP 100 and the internal server 200 connected to the LAN 3 can respectively transmit and receive data via the LAN 3. The LAN 3 is a closed environment having limited devices connected to the LAN 3, so that security is ensured to prevent leakage of the data transmitted and received between the MFP 100 and the internal server 200. The connection of the LAN 3 is either wired or wireless. As long as security is ensured, a network using Public Switched Telephone Networks or a Wide Area Network (WAN) may be used instead of the LAN 3.

The LAN 3 is connected to the Internet 5. Thus, the MFP 100 and the internal server 200 can respectively communicate with the verification server 500 connected to the Internet 5 via the network 3. Whereas the MFP 100 and the internal server 200 are internally provided, the verification server 500 is provided externally of the MFP 100 and the internal server 200.

In the information processing system 1 in one or more embodiments, in the case where a defect occurs in the MFP 100, the defect that has occurred in the MFP 100 is verified in the verification server 500. Then, based on a result of verification, a parameter to be set in the MFP 100 can be determined, a program to be executed in the MFP 100 can be modified or hardware resources can be replaced or added in order for the defect that has occurred in the MFP 100 not to reoccur. In order to reproduce the defect that has occurred in the MFP 100 in the verification server 500, the data that has caused the defect to occur in the MFP 100 is required. However, the data may include confidential information, so that the MFP 100 does not transmit the data to the verification server 500 but converts the data into verification data, and transmits the verification data to the verification server 500. Although the verification data is transmitted to the verification server 500 outside of the closed environment that includes the MFP 100 and the internal server 200 connected to the LAN 3, if the confidential information included in the verification data cannot be reproduced from the verification data, leakage of the confidential information can be prevented.

Figure 2:
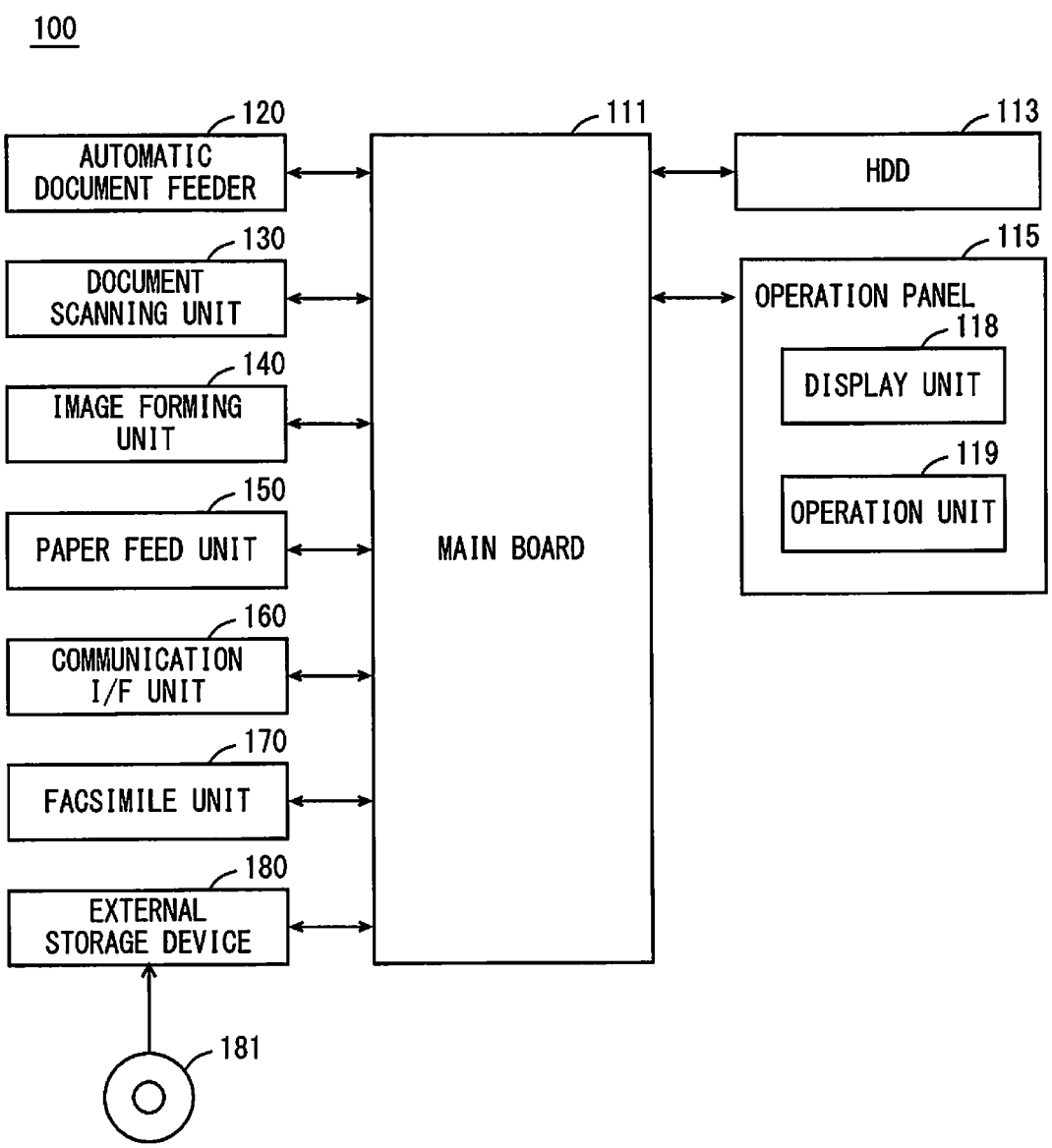
FIG. 2 is a block diagram showing one example of an outline of a hardware configuration of an MFP in one or more embodiments.

FIG. 2 is a block diagram showing one example of the outline of the hardware configuration of the MFP in one or more embodiments. Referring to FIG. 2, the MFP 100 includes a main board 111, a document scanning unit 130 for scanning a document, an automatic document feeder 120 for conveying a document to the document scanning unit 130, an image forming unit 140 for forming an image on the paper or other medium based on image data output by the document scanning unit 130 that has scanned a document, a paper feed unit 150 for supplying the paper to the image forming unit 140, a communication interface (I/F) unit 160, a facsimile unit 170, an external storage device 180, a hard disc drive (HDD) 113 as a mass storage device and an operation panel 115 serving as a user interface.

The main board 111 is connected to the automatic document feeder 120, the document scanning unit 130, the image forming unit 140 and the paper feed unit 150, the communication I/F unit 160, the facsimile unit 170, the external storage device 180, the HDD 113 and the operation panel 115, and controls the entire MFP 100.

The automatic document feeder 120 automatically transports a plurality of documents set on a document feed tray to a predetermined document scanning position set on a platen glass of the document scanning unit 130 one by one, and discharges the document, the image of which has been scanned by the document scanning unit 130, onto a document discharge tray. The document scanning unit 130 includes a light source that irradiates the document that has been transported to the document scanning position with light, and an optoelectronic transducer that receives the light reflected by the document and scans the document image according to a size of the document. The optoelectronic transducer converts the received light into image data, which is an electric signal, and outputs the image data to the image forming unit 140.

The paper feed unit 150 conveys the paper stored in the paper feed tray to the image forming unit 140. The image forming unit 140 forms an image by a well-known electrophotographic method. The image forming unit 140 forms an image on the paper that has been conveyed by the paper feed unit 150, based on the processed image data obtained when various data processing such as shading correction is performed on the image data received from the document scanning unit 130 or the externally received image data, and discharges the paper having an image formed thereon to the discharge tray.

The communication I/F unit 160 is an interface for connecting the MFP 100 to the network 3. The communication I/F unit 160 communicates with another computer connected to the network using a communication protocol such as a TCP or a UDP. The protocol for communication is not limited in particular, and any protocol can be used.

The communication I/F unit 160 outputs the data received from the network 3 to the main board 111, and outputs the data received from the main board 111 to the network 3. The communication I/F unit 160 outputs only the data, that is addressed to the MFP 100 out of the data received from the network 3, to the main board 111, and discards the data addressed to a device different from the MFP 100 out of the data received from the network 3.

The facsimile unit 170 is connected to the Public Switched Telephone Networks (PSTN), and transmits and receives facsimile data. The external storage device 180 is mounted with a CD-ROM 181 or a semiconductor memory. The external storage device 180 reads out the data stored in the CD-ROM 181 or the semiconductor memory. The external storage device 180 stores the data in the CD-ROM 181 or the semiconductor memory.

The operation panel 115 is provided on an upper surface of the MFP 100, and includes the display unit 118 and the operation unit 119. The display unit 118 is a display device such as a Liquid Crystal Display (LCD) device or an organic ELD, and displays instruction menus to users, information about the acquired image data, and the like. The operation unit 119 includes a plurality of hard keys and a touch panel. The touch panel is a multi-touch-capable panel superimposed on an upper or lower surface of the display unit 118 and detects the position designated by the user in the display surface of the display unit 118.

Figure 3:
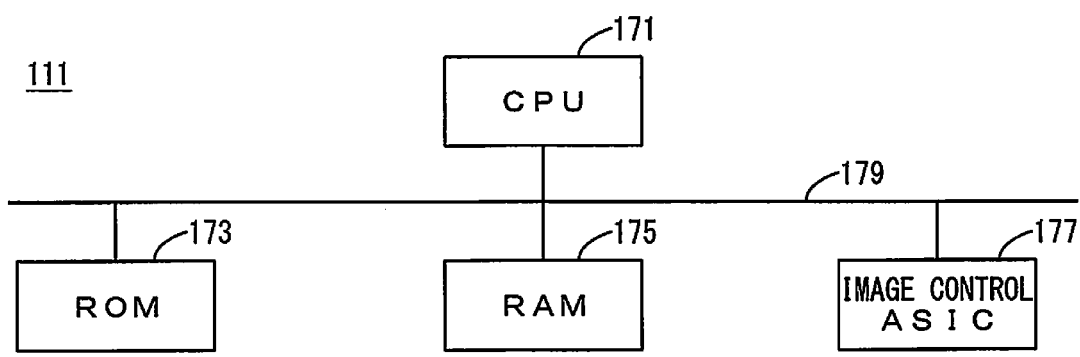
FIG. 3 is a block diagram showing one example of a detailed configuration of a main board in one or more embodiments.

FIG. 3 is a block diagram showing one example of a detailed configuration of the main board in one or more embodiments. Referring to FIG. 3, the main board 111 includes a central processing unit (CPU) 171, a ROM 173, a RAM 175 and an image control ASIC (Application Specific Integrated Circuit) 177.

The CPU 171, the ROM 173, the RAM 175 and the image control ASIC 177 are respectively connected to a bus 179 and can transfer data. The CPU 171 controls the MFP 100 as a whole. The ROM 173 stores a program executed by the CPU 171. The RAM 175 is a volatile semiconductor memory that is used as a work area of the CPU 171.

The CPU 171 loads the program stored in the HDD 113 into the RAM 175 for execution. The program executed by the CPU 171 includes a control program for controlling hardware resources and an application program. The hardware resources include the automatic document feeder 120, the document scanning unit 130, the image forming unit 140, the paper feed unit 150, the communication I/F unit 160, the facsimile unit 170, the HDD 113 and the operation panel 115. The application program includes a facsimile transmission program for controlling the facsimile unit 170 to transmit facsimile data, a facsimile reception program for controlling the facsimile unit 170 to receive facsimile data, a print program for controlling the communication I/F unit 160 to receive a print job, and controlling the image forming unit 140 and the paper feed unit 150 to form an image based on the print job, and a document scanning program for controlling the document scanning unit 130 to scan a document. Further, the application program may include a maintenance program for managing consumables included in the MFP 100 and an error state notification program for making notification of an error state. The application program executed by the CPU 171 is not limited to these.

The image control ASIC 177 is connected to and controls the automatic document feeder 120, the document scanning unit 130, the image forming unit 140 and the paper feed unit 150. Further, the image control ASIC 177 has a function of performing a predetermined image process on the image data output by the document scanning unit 130 that has scanned a document, and a function of converting the image data into raster data for printing by the image forming unit 140.

Figure 4:
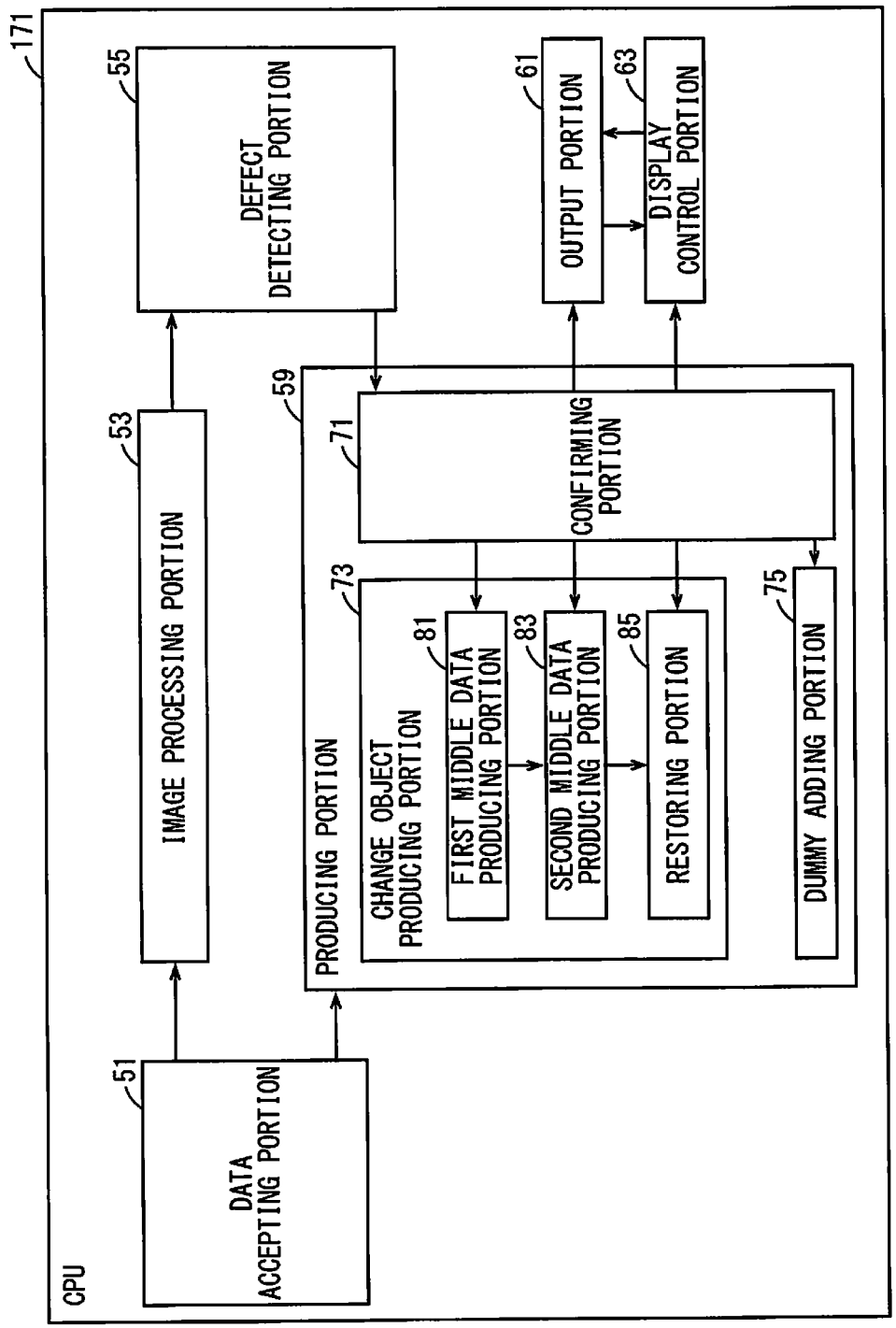
FIG. 4 is a block diagram showing one example of functions of a central processing unit (CPU) included in an MFP in one or more embodiments.

FIG. 4 is a block diagram showing one example of functions of the CPU included in the MFP in one or more embodiments. The functions shown in FIG. 4 are implemented by the CPU 171 in the case where the CPU 171 included in the MFP 100 executes an image control program stored in the ROM 173, the HDD 113 or the CD-ROM 181. Referring to FIG. 4, the CPU 171 includes a data accepting portion 51 that accepts process data, an image processing portion 53 that performs an image process on the data, a defect detecting portion 55 that detects a defect in the image process performed by the image processing portion 53, a producing portion 59 that produces verification data, an output portion 61 that externally outputs the verification data and a display control portion 63 that controls the display unit 118.

The data accepting portion 51 accepts the process data to be processed by the MFP 100. In response to acceptance of the process data, the data accepting portion 51 outputs the process data to the image processing portion 53 and the producing portion 59. The process data is object data including one or more objects. Although not restricted, an object includes lines, characters, diagrams and photos, and includes parameters required to draw the object. For example, in the case where the object is a character, the parameters include the information for specifying the character, the information for specifying a size and a font type of the character, the information about colors and the position information indicating the position where the object is arranged in the process data. Further, in the case where the object is indicated by a set of a plurality of vectors, the parameters may be the values for specifying directions, sizes and positions of the plurality of vectors. Further, in the case where the object is an image, the parameters include the information about resolution, a size and colors, and the position information indicating the position where the object is arranged in the process data.

In the case where the communication I/F unit 160 receives a print job from a personal computer (hereinafter referred to as a PC) connected to the LAN 3, the data accepting portion 51 accepts the print data included in the print job as process data. In the case where the communication I/F unit 160 receives web data from a web server connected to the Internet 5, the data accepting portion 51 accepts the web data as process data. Further, in the case where accepting an instruction for printing the data stored in the HDD 113, the data accepting portion 51 accepts the data stored in the HDD 113 as process data.

The image processing portion 53 performs an image process on the data and produces image data. In response to reception of the process data from the data accepting portion 51, the image processing portion 53 performs the image process on the process data. In the case where the process data is print data, for example, the image processing portion 53 performs the image process on the print data in accordance with a condition defined by a print job. In the case where the process data is web data or the data stored in the HDD 113, the image processing portion 53 performs an image process on the process data in accordance with a print condition input by the user in the operation unit 119.

The defect detecting portion 55 detects a defect that occurs during the image process performed by the image processing portion 53. The image processing portion 53 is an image process task that is formed when the CPU 171 executes an image process program. In the case where the image process task detects an error that is predetermined by the image process program, the defect detecting portion 55 detects a defect. The error that is predetermined by the image process program includes a timeout error meaning that a predetermined time length has elapsed since the start of the image process performed by the image processing portion 53. The predetermined time length may be proportional to a data amount of the data to be processed in the image process, for example. In the case where detecting a defect, the defect detecting portion 55 outputs defect information for specifying the detected defect to the producing portion 59. The defect information includes error identification information for identifying an error that is predetermined by the image process program.

Based on the process data received from the data accepting portion 51, the producing portion 59 produces the verification data that causes the same defect as the defect detected by the defect detecting portion 55 during the image process performed by the image processing portion 53. The producing portion 59 includes a confirming portion 71, a change object producing portion 73 and a dummy adding portion 75.

The change object producing portion 73 produces work data including at least a change object, which is at least one of the one or more objects included in the process data and is formed when at least one of a plurality of parameters defining the object is changed to a random value, in accordance with a predetermined condition.

The confirming portion 71 stores the defect information, output by the defect detecting portion 55 that has detected a defect in the case where the image processing portion 53 performs the image process on the process data, in the RAM 175 as reference error information. The confirming portion 71 allows the image processing portion 53 to process the work data produced by the change object producing portion 73. In the case where receiving the same defect information as the reference error information from the defect detecting portion 55, the confirming portion 71 determines the work data as the verification data.

Here, the process data input in the producing portion 59 is object data including one or more objects, by way of example. The change object producing portion 73 includes a first middle data producing portion 81, a second middle data producing portion 83 and a restoring portion 85. In response to reception of the defect information output by the defect detecting portion 55 that has detected a defect in the case where the image processing portion 53 performs the image process on the process data, the confirming portion 71 outputs a production instruction to the first middle data producing portion 81.

The first middle data producing portion 81 produces first middle data including at least one of the one or more objects included in the process data received from the data accepting portion 51. In other words, the first middle data producing portion 81 produces the first middle data including at least the object, which causes the same defect as the defect detected by the defect detecting portion 55 in the case where the image processing portion 53 performs the image process on the process data, out of the one or more objects included in the process data received from the data accepting portion 51.

Specifically, the first middle data producing portion 81 sets the process data as the first middle data, and selects the one or more objects included in the process data one by one. The first middle data producing portion 81 produces the work data by deleting the object selected from the first middle data. In the case where receiving the same defect information as the reference error information from the defect detecting portion 55 after allowing the image processing portion 53 to perform the image process on the work data produced by the first middle data producing portion 81, the confirming portion 71 outputs a success signal to the first middle data producing portion 81. In the case where not receiving the same defect information as the reference error information from the defect detecting portion 55 after allowing the image processing portion 53 to perform the image process on the work data produced by the first middle data producing portion 81, the confirming portion 71 outputs an error signal to the first middle data producing portion 81.

In the case where receiving the success signal from the confirming portion 71, the first middle data producing portion 81 sets the work data as the first middle data, and selects a next object. However, in the case where receiving the error signal from the confirming portion 71, the first middle data producing portion 81 does not set the work data as the first middle data, and selects a next object. The first middle data producing portion 81 selects all of the one or more objects included in the process data. In the case where the image process of the work data, which is formed when the lastly selected object is deleted from the first middle data, is completed, the first middle data producing portion 81 outputs the first middle data at that time point to the second middle data producing portion 83. Therefore, the first middle data output by the first middle data producing portion 81 to the second middle data producing portion 83 causes the defect specified by the reference error information to occur when processed by the image processing portion 53.

In response to reception of the first middle data from the first middle data producing portion 81, the second middle data producing portion 83 produces the second middle data as the work data by changing all of a plurality of parameters defining an object to random values for at least one object included in the first middle data. However, in the case where the attribute of the object is an image, the second middle data producing portion 83 changes the parameter controlling the image out of the plurality of parameters defining the object to a random value smaller than the set parameter. The parameter controlling the image defines resolution or a size of the object, for example. In the case where the attribute of the object is an image, the change of the parameter controlling the image to the smaller value reduces the resolution or size of the object. Thus, viewability can be lowered.

In the case where receiving the same defect information as the reference error information from the defect detecting portion 55 after allowing the image processing portion 53 to perform the image process on the second middle data produced by the second middle data producing portion 83, the confirming portion 71 determines the second middle data as the verification data. In the case where not receiving the same defect information as the reference error information from the defect detecting portion 55, the confirming portion 71 allows the second middle data producing portion 83 to output the second middle data to the restoring portion 85, and outputs a restoration instruction to the restoring portion 85. The object, which is one or more objects included in the verification data and at least one of a plurality of parameters of which is changed when the verification data is determined, is referred to as a change object.

The restoring portion 85 receives the second middle data from the second middle data producing portion 83. In response to reception of a restoration instruction from the confirming portion 71, the restoring portion 85 produces the work data by changing one of a plurality of parameters of at least one object included in the second middle data to the value before the change by the second middle data producing portion 83.

In the case where receiving the same defect information as the reference error information from the defect detecting portion 55 after allowing the image processing portion 53 to perform the image process on the work data produced by the restoring portion 85, the confirming portion 71 determines the work data as the verification data. In the case where not receiving the same defect information as the reference error information from the defect detecting portion 55, the confirming portion 71 outputs a re-restoration instruction to the restoring portion 85.

In response to reception of the re-restoration instruction from the confirming portion 71, the restoring portion 85 produces the new work data by changing back one of the plurality of parameters of each of one or more objects included in the work data to the value before the change by the second middle data producing portion 83. Therefore, the confirming portion 71 outputs the re-restoration instruction to the restoring portion 85 in the case where the same defect information as the reference error information is not received from the defect detecting portion 55. Therefore, one of the plurality of parameters of each of the one or more objects included in the work data is changed back by the restoring portion 85 to the value before the change by the second middle data producing portion 83 until the same defect information as the reference error information is received from the defect detecting portion 55.

In the case where determining the verification data, the confirming portion 71 outputs an adding instruction to the dummy adding portion 75. In response to reception of the adding instruction, the dummy adding portion 75 produces the work data by adding one or more dummy objects to the verification data. A dummy object is an object that is randomly produced. The number of dummy objects may allow the ratio of the total sum of dummy objects to the total sum of one or more objects included in the verification data to which a dummy object has not been added yet to be equal to or larger than a predetermined value. Further, the number of dummy objects may be random.

In the case where receiving the same defect information as the reference error information from the defect detecting portion 55 after allowing the image processing portion 53 to perform the image process on the work data, which is formed when a dummy object is added to the verification data by the dummy adding portion 75, the confirming portion 71 sets the work data as the new verification data and outputs the new verification data to the output portion 61 and the display control portion 63. In the case where not receiving the same defect information as the reference error information from the defect detecting portion 55 after allowing the image processing portion 53 to perform the image process on the work data, which is formed when a dummy object is added to the verification data by the dummy adding portion 75, the confirming portion 71 outputs a re-adding instruction to the dummy adding portion 75. In response to reception of the re-adding instruction, the dummy adding portion 75 produces the work data by adding one or more new dummy objects to the verification data. In the case where receiving the same defect information as the reference error information from the defect detecting portion 55 after allowing the image processing portion 53 to perform the image process on the work data produced by the dummy adding portion 75, the confirming portion 71 sets the work data as the new verification data and outputs the new verification data to the output portion 61 and the display control portion 63. In the case where not receiving the same defect information as the reference error information from the defect detecting portion 55 after allowing the image processing portion 53 to perform the image process on the work data, which is formed when a dummy object is added to the verification data by the dummy adding portion 75, the confirming portion 71 outputs a re-adding instruction to the dummy adding portion 75 until receiving the same defect information as the reference error information from the defect detecting portion 55.

In response to reception of the verification data, the display control portion 63 determines whether a display condition is satisfied. Here, a first display condition is that the ratio of the number of change objects produced by the change object producing portion 73 to the number of one or more objects included in the process data is equal to or larger than a first threshold value. A second display condition is that the ratio of the number of changed parameters to the number of the plurality of parameters defining one or more change objects produced by the change object producing portion 73 is equal to or smaller than a second threshold value. In the case where at least one of the first display condition and the second display condition is not satisfied, the display control portion 63 displays a notification screen in the display unit 118. In the case where both of the first display condition and the second display condition are satisfied, the display control portion 63 outputs an output instruction to the output portion 61 without displaying the notification screen in the display unit 118. The notification screen includes an image of the verification data and a button for accepting a user's operation of permitting the output.

In the case where the notification screen is displayed by the display control portion 63, in response to acceptance by the operation unit 119 of an operation of designating the button for permitting the output included in the notification screen, the output portion 61 transmits the verification data to the verification server 500. In response to reception of the output instruction from the display control portion 63 without the display of the notification screen, the output portion 61 transmits the verification data to the verification server 500.

In the case where none of the first display condition and the second display condition is satisfied, the display control portion 63 may display the notification screen in the display unit 118. In the case where at least one of the first display condition and the second display condition is satisfied, the display control portion 63 may output the output instruction to the output portion 61 without displaying the notification screen in the display unit 118.

Figure 5:
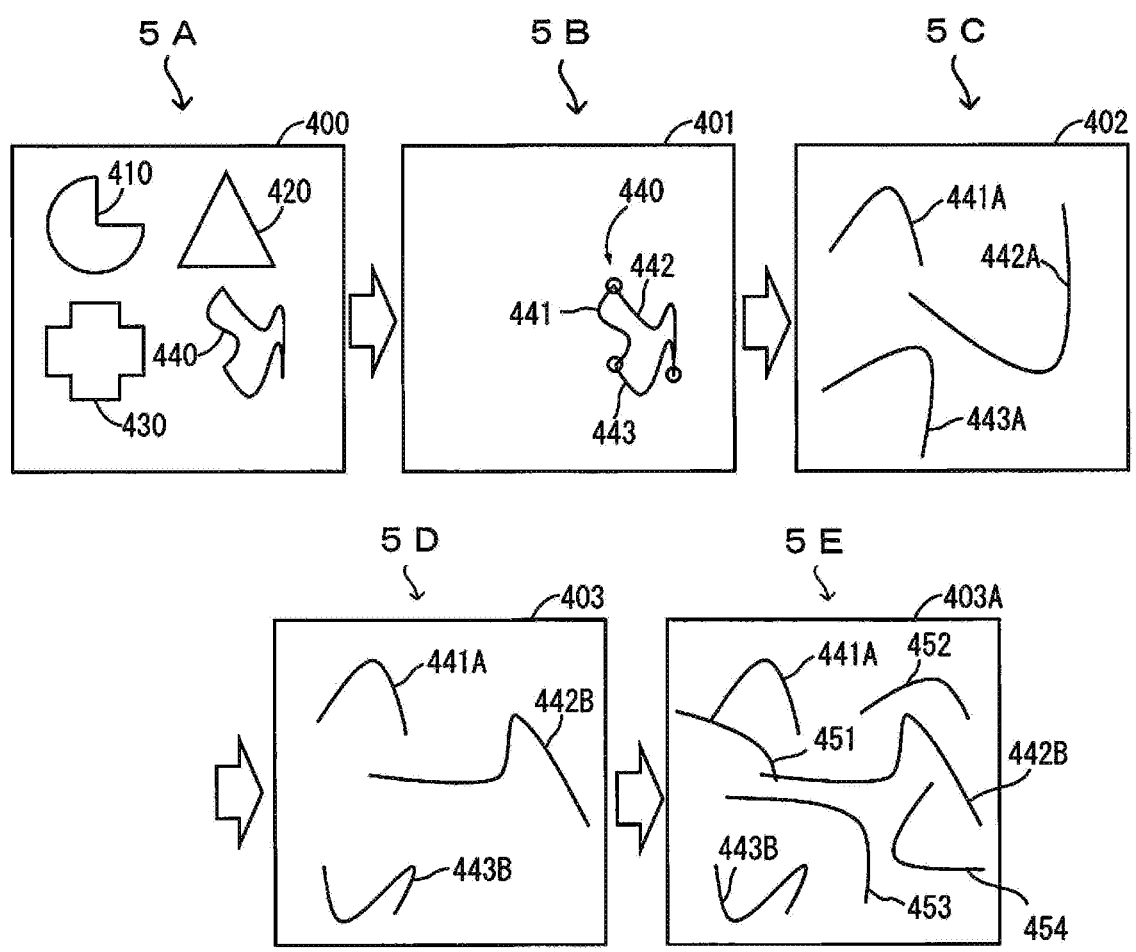
FIG. 5 is a diagram showing one example of steps for producing verification data from process data.

FIG. 5 is a diagram showing one example of the steps for producing the verification data from the process data. Step 5A shows one example of the process data. The process data 400 includes four object groups 410, 420, 430, 440. Each of the four object groups 410, 420, 430, 440 is constituted by one or more objects.

Step 5B shows one example of the first middle data. The first middle data 401 is the data that is formed when the three object groups 410, 420, 430 are deleted from the process data 400, and includes the object group 440. In the case where the image process is performed on the first middle data 401, the same defect as the defect that occurs during the image process of the process data 400 occurs. The object group 440 includes three objects 441 to 443. The circular marks in the diagram are added for convenience to indicate the three objects 441 to 443 and do not actually exist. In this case, the defect occurs due to the combination of the three objects 441 to 443.

Step 5C shows one example of the second middle data. The second middle data 402 includes three change objects 441A to 443A. The change object 441A is formed when all of the plurality of parameters defining the object 441 are changed to random values. The change object 442A is formed when all of the plurality of parameters defining the object 442 are changed to random values. The change object 443A is formed when all of the plurality of parameters defining the object 443 are changed to random values.

Step 5D shows one example of the verification data. The verification data 403 includes three change objects 441A, 442B, 443B. The change object 442B is formed when at least one of the plurality of parameters defining the change object 442A is changed back to the parameter defining the original object 442. The change object 443B is formed when at least one of the plurality of parameters defining the change object 443A is changed back to the parameter defining the original object 443.

Step 5E shows another example of the verification data. In addition to the three change objects 441A, 442B, 443B, the verification data 403A includes four dummy objects 451 to 454. The dummy objects 451 to 454 are randomly produced.

Figure 6:
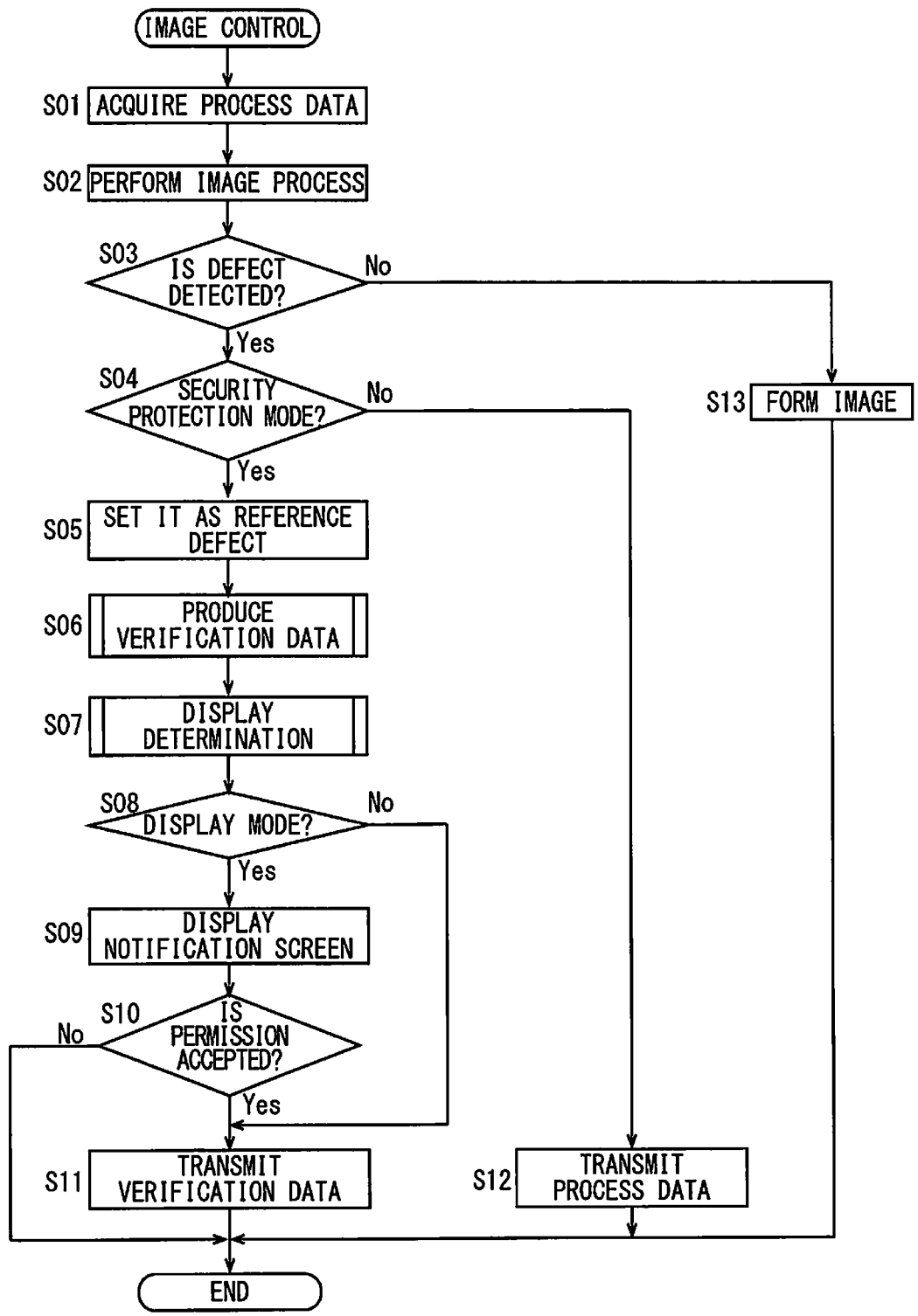
FIG. 6 is a flow chart showing one example of a flow of an image control process in one or more embodiments.

FIG. 6 is a flow chart showing one example of a flow of the image control process in one or more embodiments. The image control process is a function implemented by the CPU 171 in the case where the CPU 171 included in the MFP 100 executes an image control program stored in the ROM 173, the HDD 113 or the CD-ROM 181. Referring to FIG. 6, the CPU 171 acquires the process data to be processed in the image process (step S01). In the case where the communication I/F unit 160 receives a print job from a PC connected to the LAN 3, the CPU 171 accepts the print data included in the print job as the process data. In the case where the communication I/F unit 160 receives web data from a web server connected to the Internet 5, the CPU 171 accepts the web data as the process data. Further, in the case where accepting an instruction for printing the data stored in the HDD 113, the CPU 171 accepts the data stored in the HDD 113 as the process data.

In the next step S02, the CPU 171 performs the image process on the process data (step S02). Then, the CPU 171 determines whether a defect has been detected in the image process (step S03). In the case where the task of executing the image process program detects an error that is predetermined by the image process program, or the case where the image control ASIC 177 detects an error, the CPU 171 detects a defect. If a defect is detected, the process proceeds to the step S04. If not, the process proceeds to the step S13. In the step S13, the CPU 171 controls the image forming unit 140 and forms an image of the image data that has been processed in the image process on the paper, and the process ends.

In the step S04, whether a security protection mode is set is determined. In the case where the security protection mode is set for the process data, it is determined that the security protection mode is set. If the security protection mode is set, the process proceeds to the step S05. If not, the process proceeds to the step S12. In the step S12, the CPU 171 controls the communication I/F unit 160 to transmit the process data to the verification server 500, and the process ends.

In the step S05, the defect detected in the step S03 is set as a reference detect. The defect is an error detected by the task of executing the image process program or the image control ASIC 177, so that the error identification information of the error is stored in the RAM 175 as the defect information indicating the reference defect.

In the next step S06, the CPU 171 performs a verification data production process, and the process proceeds to the step S07. While details of the verification data production process will be described below, the verification data production process is a process of producing the verification data, which is produced based on the process data and causes the same defect as the reference defect when processed in the image process. In the step S07, the CPU 171 performs a display determination process, and the process proceeds to the step S08. While details of the display determination process will be described below, the display determination process is a process of determining whether to display the notification screen. In the case where the CPU 171 determines to display the notification screen, the display mode is set. In the case where CPU 171 determines not to display the notification screen, the non-display mode is set. In the next step S08, the CPU 171 determines whether the display mode is set as a result of the display determination process. If the display mode is set, the process proceeds to the step S09. If not, the process proceeds to the step S11.

In the step S09, the notification screen is displayed, and the process proceeds to the step S10. The notification screen includes an image of the verification data and a button for accepting a user's operation of permitting the output. Then, the CPU 171 determines whether the user's permission has been accepted (step S10). If an operation of designating the button for accepting the user's operation of permitting the output included in the notification screen is accepted, the user's permission is accepted. If the user's permission is accepted, the process proceeds to the step S11. If not, the process ends. In the step S11, the CPU 171 controls the communication I/F unit 160 to transmit the verification data to the verification server 500, and the process ends.

Figure 7:
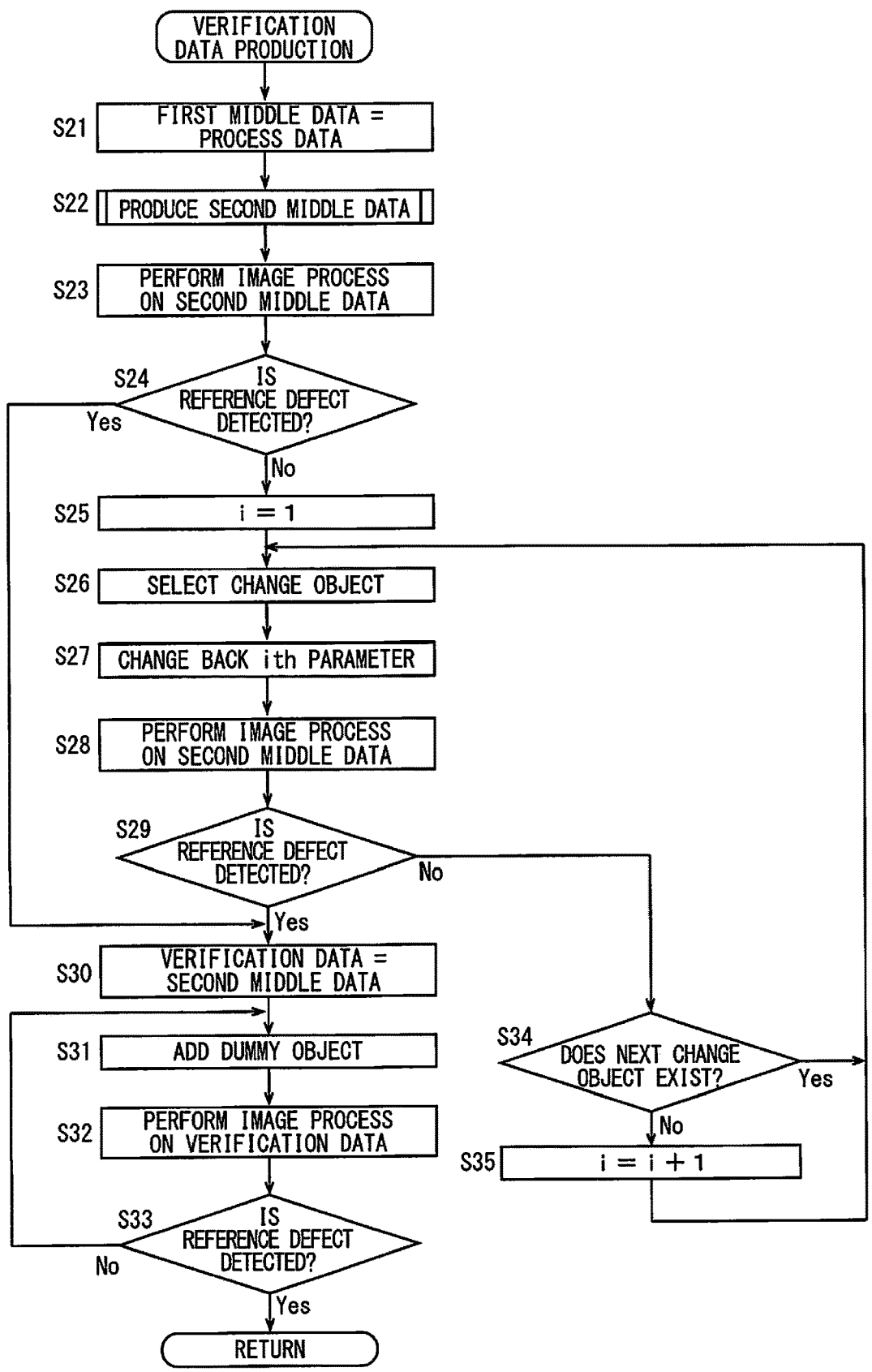
FIG. 7 is a flow chart showing one example of a flow of a verification data production process.

FIG. 7 is a flow chart showing one example of a flow of a verification data production process. The verification data production process is a process performed in the step S06 of FIG. 6. The process data is acquired, and the reference defect is set, before the verification data production process is performed. Referring to FIG. 7, the CPU 171 sets the process data as the first middle data (step S21), and the process proceeds to the step S22. Specifically, a copy of the process data is the first middle data. Then, in the step S22, the second middle data production process is performed.

Figure 8:
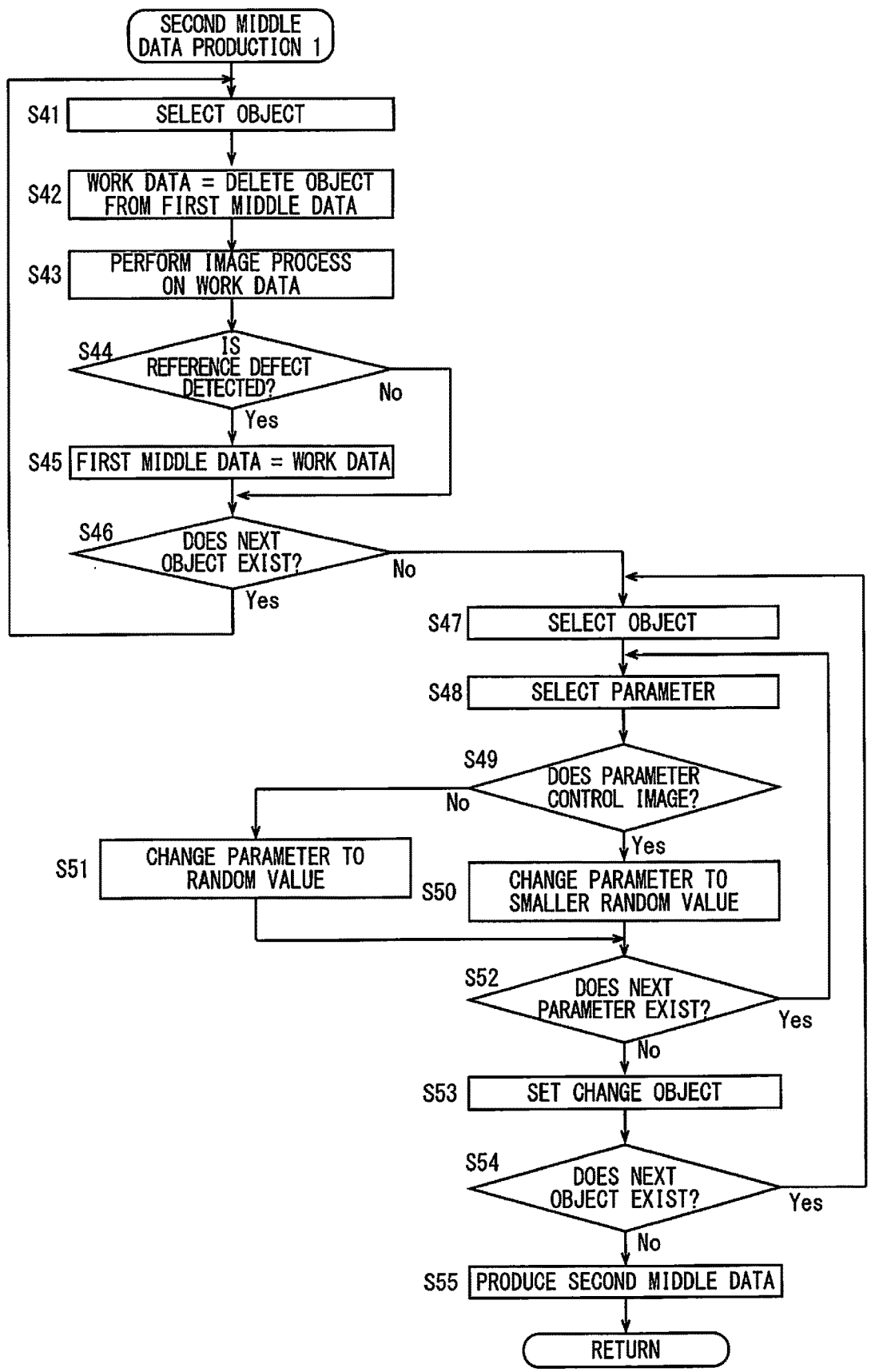
FIG. 8 is a flow chart showing one example of a flow of a second middle data production process.

FIG. 8 is a flow chart showing one example of a flow of a second middle data production process. Referring to FIG. 8, the CPU 171 selects one of the one or more objects included in the first middle data (step S41). Then, the CPU 171 sets the data, which is formed when the object selected in the step S41 is deleted from the first middle data, as the work data (step S42).

In the next step S43, the image process is performed on the work data. Then, the CPU 171 determines whether the same defect as the reference defect has been detected (step S44). If the same defect as the reference defect is detected, the process proceeds to the step S45. If not, the process proceeds to the step S46. In the step S45, the work data is set as the first middle data, and the process proceeds to the step S46. In the step S46, the CPU 171 determines whether the object that is not selected in the step S41 exists among the one or more objects included in the first middle data. If an unselected object exists, the process returns to the step S41. If not, the process proceeds to the step S47. In the step S45, the CPU 171 sets the data that is formed when one of the one or more objects included in the first middle data is deleted as the work data, so that the data, which is formed when one object is deleted from the process data, is set as the first middle data every time the step S45 is performed.

In the step S47, the CPU 171 selects one object from among the one or more objects included in the first middle data. Then, the CPU 171 selects one of the plurality of parameters defining the selected object as a process subject (step S48). In the step S49, the CPU 171 determines whether the selected parameter controls an image. One example of the parameter for controlling an image is resolution or a size. If the parameter controls an image, the process proceeds to the step S50. If not, the process proceeds to the step S51. In the step S50, the parameter is changed to a random smaller value, and the process proceeds to the step S52. In the step S51, the parameter is changed to a random value, and the process proceeds to the step S52. In the step S52, the CPU 171 determines whether a parameter that is not selected as a process subject in the step S48 exists among the plurality of parameters defining the object selected as the process subject in the step S47. If an unselected parameter exists, the process returns to the step S48. If not, the process proceeds to the step S53. Therefore, all of a plurality of parameters defining the object that is selected as a process subject in the step S47 are changed to random values. In the step S53, the CPU 171 sets the object, that has been selected as the process subject and the parameters of which have been changed, as a change object, and the process proceeds to the step S54.

In the step S54, the CPU 171 determines whether an object that is not selected as a process subject in the step S47 exists among the one or more objects included in the first middle data. If an unselected object exists, the process returns to the step S47. If not, the process proceeds to the step S55. Thus, one or more change objects corresponding to all of the one or more objects included in the first middle data are produced.

In the step S55, the CPU 171 produces the second middle data by replacing one or more objects included in the first middle data with one or more change objects, and the process returns to the verification data production process.

Returning to FIG. 7, the image process is performed on the second middle data in the step S23. Then, the CPU 171 determines whether the same defect as the reference defect has been detected (step S24). If the same defect as the reference defect has been detected, the process proceeds to the step S30. If not, the process proceeds to the step S25.

In the step S25, a variable "i" is set as 1. The variable "i" is a value for specifying the order assigned to parameters. In the next step S26, the CPU 171 selects one change object from among the one or more change objects included in the second middle data, and the process proceeds to the step S27. In the step S27, the CPU 171 changes back the i-th parameter out of the plurality of parameters defining the selected change object to the original value. The parameter that is changed to a random value in the step S50 or the step S51 of the second middle data production process is changed back to the value before the change.

In the next step S28, the image process is performed on the second middle data. Then, the CPU 171 determines whether the same defect as the reference defect is detected (step S29). If the same defect as the reference defect is detected, the process proceeds to the step S30. If not, the process proceeds to the step S34. In the step S34, the CPU 171 determines whether a change object that is not selected in the step S26 exists among the one or more change objects included in the second middle data. If an unselected change object exists, the process returns to the step S26. If an unselected change object does not exist, the process proceeds to the step S35. Thus, one or more change objects included in the second middle data are sequentially selected, and the i-th parameter of each change object is changed back to an original value. In the step S35, the variable "i" is incremented, and the process returns to the step S26. Thus, in the case where the i-th parameters of all of the one or more change objects are changed back to the original values, the (i+1)-th parameters of the one or more change objects are sequentially changed back to the original values.

The process proceeds to the step S30 in the case where the same defect as the reference defect is detected during the image process of the second middle data in the step S23 or the step S28. In the step S30, the second middle data is set as the verification data, and the process proceeds to the step S31. In the step S31, a dummy object is added to the verification data. The dummy object is an object that is randomly produced. Because a dummy object is added to the verification data, this complicates the work of reproducing the process data only from the verification data.

In the next step S32, the image process is performed on the verification data to which the dummy object has been added. Then, the CPU 171 determines whether the same defect as the reference defect is detected (step S33). If the same defect as the reference defect is detected, the process returns to the image control process. If not, the process returns to the step S31. In the step S31 to be performed next, the CPU 171 deletes the previously added dummy object from the second middle data, and adds another dummy object. Thus, the CPU 171 can produce the verification data that causes the same defect as the reference defect during the image process.

Figure 9:
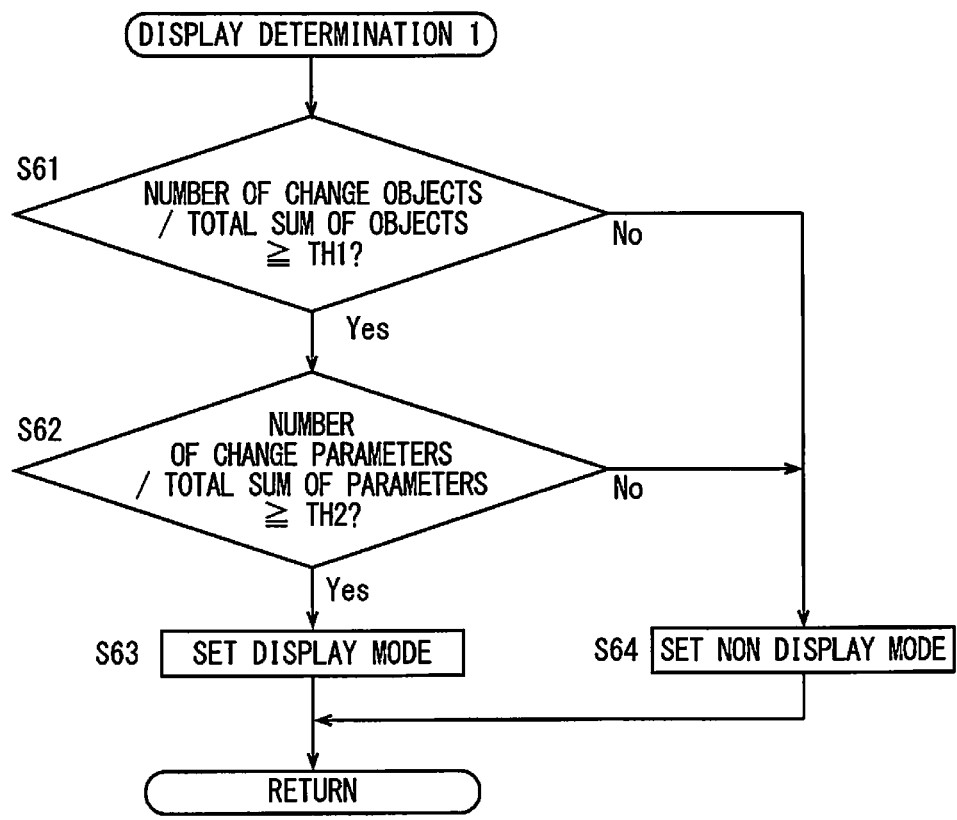
FIG. 9 is a flow chart showing one example of a flow of a display determination process.

FIG. 9 is a flow chart showing one example of a flow of a display determination process. The display determination process is performed in the step S07 of FIG. 6. The verification data is produced before the display determination process is performed. Referring to FIG. 9, the CPU 171 determines whether the ratio of the total sum of the one or more change objects included in the verification data to the total sum of objects included in the process data is equal to or larger than a threshold value TH1 (step S61). If YES, the process proceeds to the step S62. If NO, the process proceeds to the step S64. In the step S62, the CPU 171 determines whether the ratio of the total sum of the change parameters to the total sum of the parameters is equal to or larger than a threshold value TH2. If YES, the process proceeds to the step S63. If NO, the process proceeds to the step S64. The total sum of change parameters is the total sum of the parameters that have been changed to random values among parameters of each of one or more change objects included in the verification data. The total sum of parameters is the total sum of parameters of each of the objects included in the process data. In the step S63, the display mode is set, and the process returns to the image control process. In the step S64, the non-display mode is set, and the process returns to the image control process.

<Modified Example>

In the above-mentioned information processing system in the embodiments, the process data is object data, by way of example. In the information processing system in the modified example, the process data is image data. In this case, the MFP 100 in the modified example performs an image process of converting the image data into object data.

The CPU 171 included in the MFP 100 in the modified example has functions similar to the functions shown in FIG. 4. Referring to FIG. 4, the data accepting portion 51 accepts the facsimile data received by the facsimile unit 170 or the image data that is output by the image scanning unit 130 that has scanned a document as process data, and the image processing portion 53 performs the image process of converting the process data into the object data. The defect detecting portion 55 detects a defect that occurs during conversion of the process data into the object data by the image processing portion 53.

In the case where a defect is detected by the defect detecting portion 55, the first middle data producing portion 81 sequentially extracts portions that can be converted into objects from the process data received from the data accepting portion 51, deletes the portions that can be converted into objects from the process data, and produces the data including a portion that cannot be converted into an object as the first middle data. The first middle data producing portion 81 produces the first middle data that includes at least the object that causes the same defect as the defect detected by the defect detecting portion 55 during the image process of the process data by the image processing portion 53, out of the one or more objects included in the process data.

For example, the first middle data producing portion 81 sets the process data as the first middle data, and selects the portions that can be converted into objects one by one from the process data. The first middle data producing portion 81 produces the work data by deleting the portions selected from the first middle data. In the case where receiving the same defect information as the reference error information from the defect detecting portion 55 after allowing the image processing portion 53 to perform the image process on the work data produced by the first middle data producing portion 81, the confirming portion 71 outputs a success signal to the first middle data producing portion 81. In the case where not receiving the same defect information as the reference error information from the defect detecting portion 55, the confirming portion 71 outputs an error signal to the first middle data producing portion 81.

In the case where receiving a success signal from the confirming portion 71, the first middle data producing portion 81 sets the work data as the first middle data, and selects a next portion. However, in the case where receiving an error signal from the confirming portion 71, the first middle data producing portion 81 does not set the work data as the first middle data, and selects a next portion. The first middle data producing portion 81 selects all portions that can be converted into objects included in the process data. In the case where the image process of the work data that is formed when the lastly selected portion is deleted from the first middle data is completed, the first middle data producing portion 81 outputs the first middle data at that time point to the second middle data producing portion 83. Therefore, when the image processing portion 53 performs the image process on the first middle data that is output by the first middle data producing portion 81 to the second middle data producing portion 83, the defect specified by the reference error information occurs.

In response to receiving the first middle data from the first middle data producing portion 81, the second middle data producing portion 83 sets the data, that is formed when the first middle data is converted into object data, an attribute of which is an image, as the second middle data. In this case, the first middle data may be divided into a plurality of data pieces, and each of the plurality of data pieces may be taken as a plurality of objects, an attribute of which is an image, after division. As for each of one or more objects included in the second middle data, the second middle data producing portion 83 produces the second middle data as the work data by changing all of a plurality of parameters defining the object to random values. In this case, an attribute of the one or more objects included in the second middle data is an image, so that the parameter that controls the image out of the plurality of parameters defining the object is changed to a random value that is smaller than the value of the set parameter. The parameter controlling the image is changed to a smaller value, so that viewability can be lowered.

In the case where receiving the same defect information as the reference error information from the defect detecting portion 55 after allowing the image processing portion 53 to perform the image process on the second middle data produced by the second middle data producing portion 83, the confirming portion 71 determines the second middle data as the verification data. In the case where not receiving the same defect information as the reference error information from the defect detecting portion 55 after allowing the image processing portion 53 to perform the image process on the second middle data produced by the second middle data producing portion 83, the confirming portion 71 allows the second middle data producing portion 83 to output the second middle data to the restoring portion 85, and outputs a restoration instruction to the restoring portion 85. The object, which is one or more objects included in the verification data and at least one of a plurality of parameters of which is changed when the verification data is determined, is referred to as a change object.

The restoring portion 85 receives the second middle data from the second middle data producing portion 83. In response to reception of a restoration instruction from the confirming portion 71, the restoring portion 85 produces the work data by changing back one of a plurality of parameters of each of at least one object included in the second middle data to the value before the change by the second middle data producing portion 83.

In the case where receiving the same defect information as the reference error information from the defect detecting portion 55 after allowing the image processing portion 53 to perform the image process on the work data produced by the restoring portion 85, the confirming portion 71 determines the work data as the verification data. In the case where not receiving the same defect information as the reference error information from the defect detecting portion 55 after allowing the image processing portion 53 to perform the image process on the work data produced by the restoring portion 85, the confirming portion 71 outputs a re-restoration instruction to the restoring portion 85.

In response to reception of the re-restoration instruction from the confirming portion 71, the restoring portion 85 produces the new work data by changing back one of the plurality of parameters of each of one or more objects included in the work data to the value before the change by the second middle producing portion 83. Therefore, the confirming portion 71 outputs the re-restoration instruction to the restoring portion 85 in the case where the same defect information as the reference error information is not received from the defect detecting portion 55. Therefore, one of the plurality of parameters of each of the one or more objects included in the work data is changed back by the restoring portion 85 to the value before the change by the second middle data producing portion 83 until the same defect information as the reference error information is received from the defect detecting portion 55.

In the case where determining the verification data, the confirming portion 71 outputs an adding instruction to the dummy adding portion 75. In response to reception of the adding instruction, the dummy adding portion 75 produces the work data by adding one or more dummy objects to the verification data. A dummy object is an object that is randomly produced. The number of dummy objects preferably allows the ratio of the total sum of areas of dummy objects to the total sum of areas of one or more objects included in the verification data to be equal to or larger than a predetermined value.

In the case where receiving the same defect information as the reference error information from the defect detecting portion 55 after allowing the image processing portion 53 to perform the image process on the work data that is formed when a dummy object is added to the verification data by the dummy adding portion 75, the confirming portion 71 sets the work data as the new verification data, and outputs the new verification data to the output portion 61 and the display control portion 63. In the case where not receiving the same defect information as the reference error information from the defect detecting portion 55, the confirming portion 71 outputs a re-adding instruction to the dummy adding portion 75. In response to reception of the re-adding instruction, the dummy adding portion 75 produces the work data by adding one or more new dummy objects to the verification data. In the case where receiving the same defect information as the reference error information from the defect detecting portion 55 after allowing the image processing portion 53 to perform the image process on the work data produced by the dummy adding portion 75, the confirming portion 71 sets the work data as the new verification data and outputs the new verification data to the output portion 61 and the display control portion 63. In the case where not receiving the same defect information as the reference error information from the defect detecting portion 55 after allowing the image processing portion 53 to perform the image process on the work data that is produced when a dummy object is added to the verification data by the dummy adding portion 75, the confirming portion 71 outputs a re-adding instruction to the dummy adding portion 75 until receiving the same defect information as the reference error information from the defect detecting portion 55.

In response to reception of the verification data, the display control portion 63 determines whether a display condition is satisfied. Here, a third display condition is that the ratio of the total sum of areas of the change objects included in the verification data to the area of the process data is equal to or larger than a third threshold value. In the case where the third display condition is satisfied, the display control portion 63 displays a notification screen in the display unit 118. In the case where the third display condition is not satisfied, the display control portion 63 does not display the notification screen in the display unit 118 and outputs an output instruction to the output portion 61. The notification screen includes an image of the verification data and a button for accepting a user's operation of permitting the output.

Figure 10:
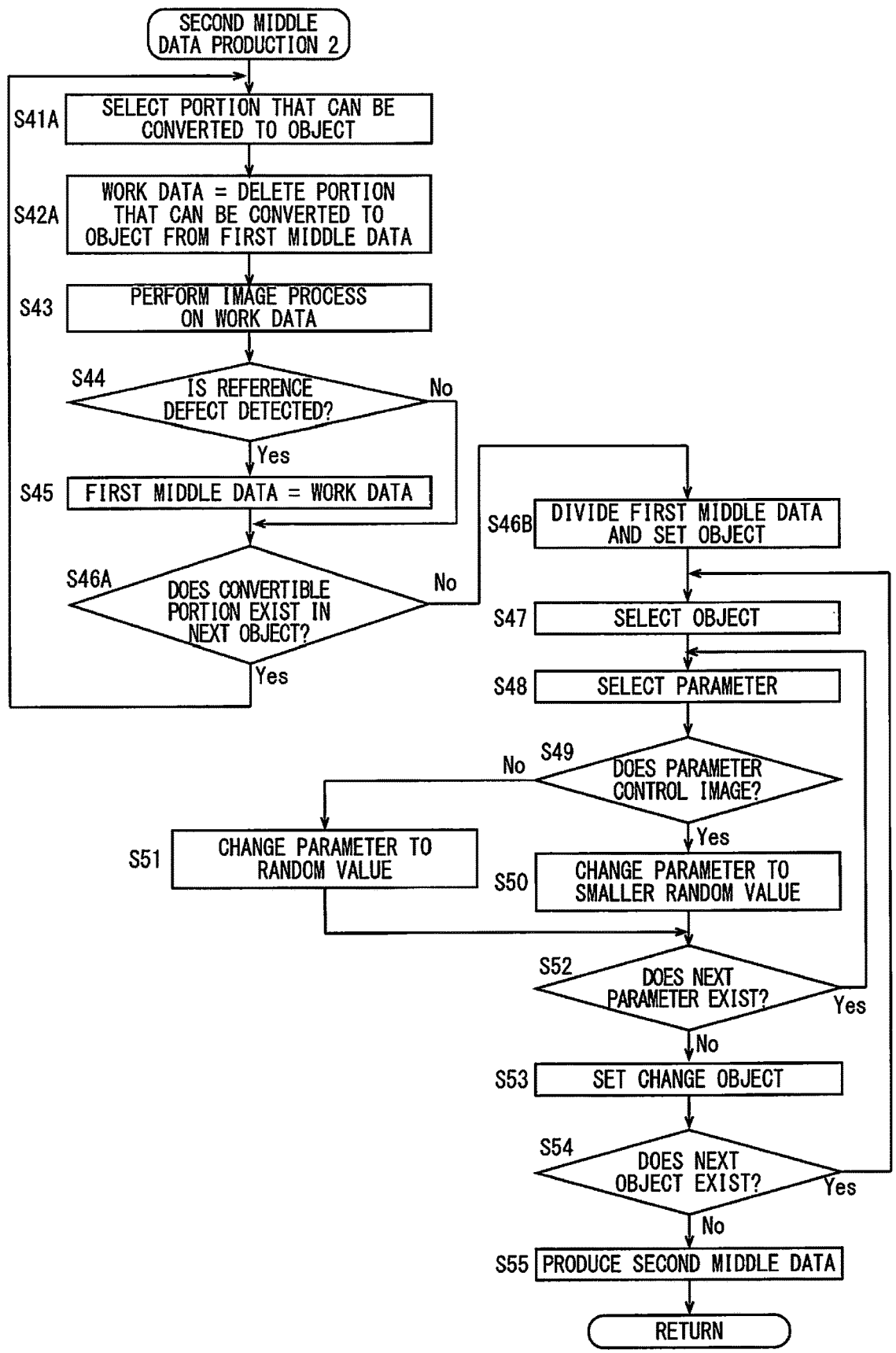
FIG. 10 is a flow chart showing one example of a flow of a second middle data production process in a modified example.

FIG. 10 is a flow chart showing one example of a flow of a second middle data production process in a modified example. Differences from the process shown in FIG. 8 are that the step S41, the step S42 and the step S46 are respectively changed to the step S41A, the step S42A and the step S46A, and that the step S46B is added after the step S46A. The other processes are the same as the processes shown in FIG. 8. A description therefore will not be repeated. In the step S41A, the CPU 171 selects one of the portions that can be converted into objects from the first middle data. In the step S42A, the CPU 171 sets the data that is formed when the portion selected in the step S41A is deleted from the first middle data as the work data, and the process proceeds to the step S43.

In the next step S46A, the CPU 171 determines whether portions that can be converted into objects and not selected in the step S41A exists in the first middle data. If an unselected portion exists, the process returns to the step S41A. If not, the process proceeds to the step S46B. In the step S46B, the CPU 171 sets each of a plurality of portions that are formed when the first middle data is divided as an object, an attribute of which is an image, and the process proceeds to the step S47.

FIG. 11 is a flow chart showing one example of a flow of a display determination process in a modified example. Referring to FIG. 11, differences from the process shown in FIG. 9 are that the step S61 is changed to the step S61A, and that the step S62 is deleted. In the step S61, the CPU 171 determines whether the ratio of the total sum of areas of the one or more change objects included in the verification data to an area of the verification data is equal to or larger than the threshold value TH3. If YES, the process proceeds to the step S63. If NO, the process proceeds to the step S64. In the step S63, the display mode is set, and the process returns to the image control process. In the step S64, the non-display mode is set, and the process returns to the image control process.

While the MFP 100 has a function of producing the verification data in the previously-described embodiments, the internal server 200 has the function of producing the verification data in place of the MFP 100 in the information processing system 1 in one or more embodiments.

The overview of the information processing system 1 in one or more embodiments is the same as the overview shown in FIG. 1. The hardware configuration of the MFP 100 in one or more embodiments is the same as the block diagram shown in FIGS. 2 and 3.

Figure 12:
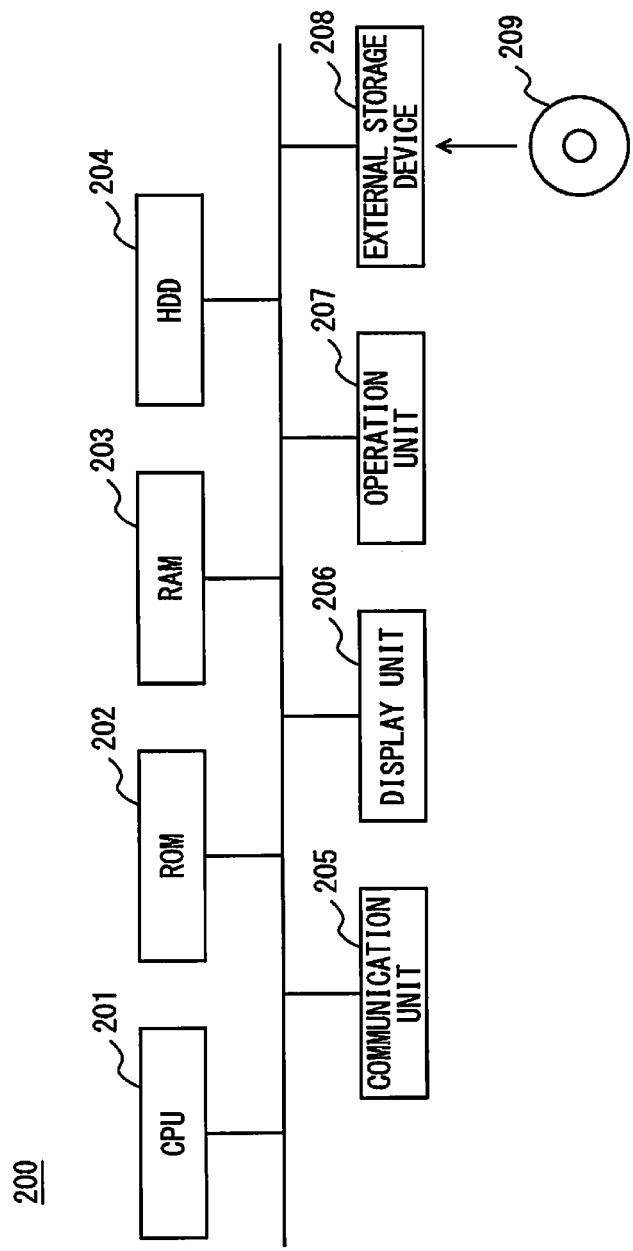
FIG. 12 is a block diagram showing one example of an outline of a hardware configuration of an internal server in one or more embodiments.

FIG. 12 is a block diagram showing one example of an outline of a hardware configuration of the internal server in one or more embodiments. Referring to FIG. 12, the internal server 200 includes a central processing unit (CPU) 201 for controlling the internal server 200 as a whole, a ROM (read only memory) 202 for storing a program executed by the CPU 201, a RAM (random access memory) 203 that is used as a work area for the CPU 201, a hard disc drive (HDD) 204 that stores data in a non-volatile manner, a communication unit 205 that connects the CPU 201 to the network 3, a display unit 206 that displays information, an operation unit 207 that accepts a user's input operation and an external storage device 208.

The display unit 206 is a display device such as a Liquid Crystal Display (LCD) device and an organic ELD (Electro-Luminescence Display). The operation unit 207 is hard keys such as a keyboard. Further, the operation unit 207 may be a touch panel. The touch panel is superimposed on an upper or lower surface of the display unit 206. The touch panel detects the position designated by the user in a display surface of the display unit 206.

The communication unit 205 is an interface for connecting the CPU 201 to the network 3. The communication unit 205 communicates with the MFP 100 connected to the network using a communication protocol such as a TCP (Transmission Control Protocol) or a UDP (User Datagram Protocol). The protocol for communication is not limited in particular, and any protocol can be used. An IP (Internet Protocol) address of the MFP 100 is registered in the internal server 200, so that the internal server 200 can communicate with the MFP 100, and can transmit and receive data.

The HDD 204 stores the program executed by the CPU 201 and the data necessary for the execution of the program. The CPU 201 loads the program recorded in the HDD 204 into the RAM 203 for execution.

The external storage device 208 is mounted with a CD-ROM (Compact Disk ROM) 209 storing a program. The CPU 201 is capable of accessing the CD-ROM 209 via the external storage device 208. The CPU 201 loads the program, recorded in the CD-ROM 209 which is mounted on the external storage device 208, into the RAM 203 for execution. It is noted that the medium for storing the program executed by the CPU 201 is not limited to the CD-ROM 209. It may be an optical disc (MO (Magnetic Optical Disc)/MD (Mini Disc)/DVD (Digital Versatile Disc)), an IC card, an optical card, and a semiconductor memory such as a mask ROM or an EPROM (Erasable Programmable ROM).

Further, the program executed by the CPU 201 is not limited to a program recorded in the CD-ROM 209, and the CPU 201 may load a program, stored in the HDD 204, into RAM 203 for execution. In this case, another computer connected to the network 3 may rewrite the program stored in the HDD 204, or may additionally write a new program therein. Further, the internal server 200 may download a program from another computer connected to the network 3 or the Internet, and store the program in the HDD 204. The program referred to here includes not only a program directly executable by the CPU 201 but also a source program, a compressed program, an encrypted program or the like.

The internal server 200 in one or more embodiments includes a simulator that simulates the MFP 100.

Figure 13:
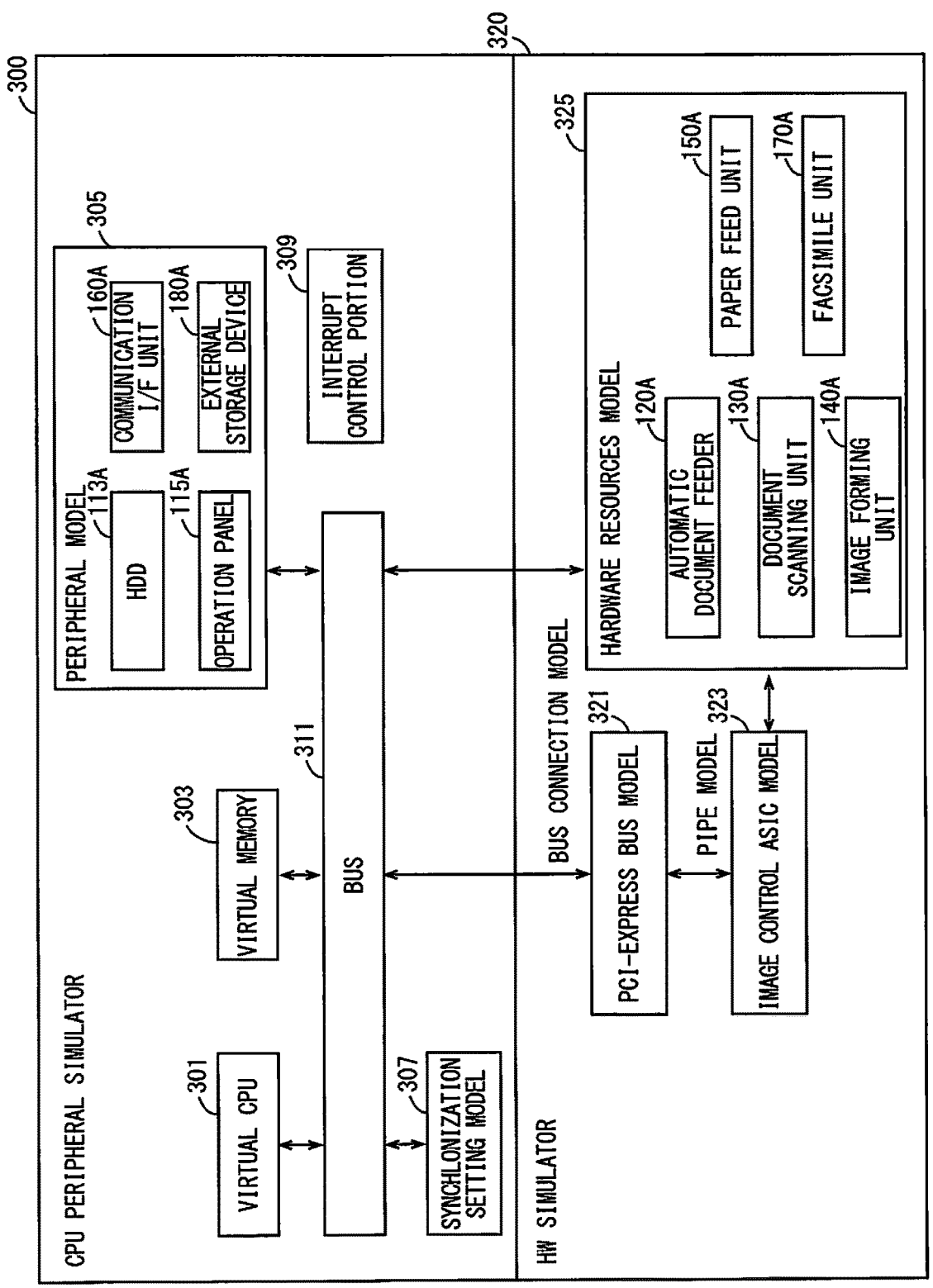
FIG. 13 is a diagram showing one example of an outline of a simulator included in an internal server in one or more embodiments.

FIG. 13 is a diagram showing one example of an outline of the simulator included in the internal server in one or more embodiments. This simulator is formed in the CPU 201 when the CPU 201 executes a simulate program. Referring to FIG. 13, the simulator includes a CPU peripheral simulator 300 and a hardware (HW) simulator 320. The CPU peripheral simulator 300 includes a virtual CPU 301 that simulates the CPU 171 included in the MFP 100, a virtual memory 303 that emulates the ROM 173 and the RAM 175, a peripheral model 305, a synchronization setting model 307 and an interrupt control portion 309. The virtual CPU 301, the virtual memory 303, the peripheral model 305 and the synchronization setting model 307 are connected to a Bus 311.

The peripheral model 305 includes an HDD 113A, an operation panel 115A, a communication I/F unit 160A and an external storage device 180A that emulate the HDD 113, the operation panel 115, the communication I/F unit 160 and the external storage device 180 that are included in the MFP 100, respectively.

The synchronization setting model 307 makes settings such that the virtual CPU 301 synchronizes with the virtual memory 303 and the peripheral model 305. When the settings are made in order for the virtual CPU 301 to synchronize with the virtual memory 303 and the peripheral model 305, the interrupt control portion 309 generates an interrupt in the virtual CPU 301.

The HW simulator 320 includes a PCI-Express Bus model 321 and an image control ASIC model 323 and a hardware resources model 325. The PCI-Express Bus model 321 is connected to the bus 311 and emulates the connection in accordance with the PCI-Express standard. The image control ASIC model 323 emulates the image control ASIC 177 included in the MFP 100. The hardware resources model 325 emulates the hardware resources included in the MFP 100. Specifically, the hardware resources model 325 includes an automatic document feeder 120A, a document scanning unit 130A, an image forming unit 140A, a paper feed unit 150A and a facsimile unit 170A that emulate the automatic document feeder 120, the document scanning unit 130, the image forming unit 140, the paper feed unit 150 and the facsimile unit 170 that are included in the MFP 100, respectively.

Figure 14:
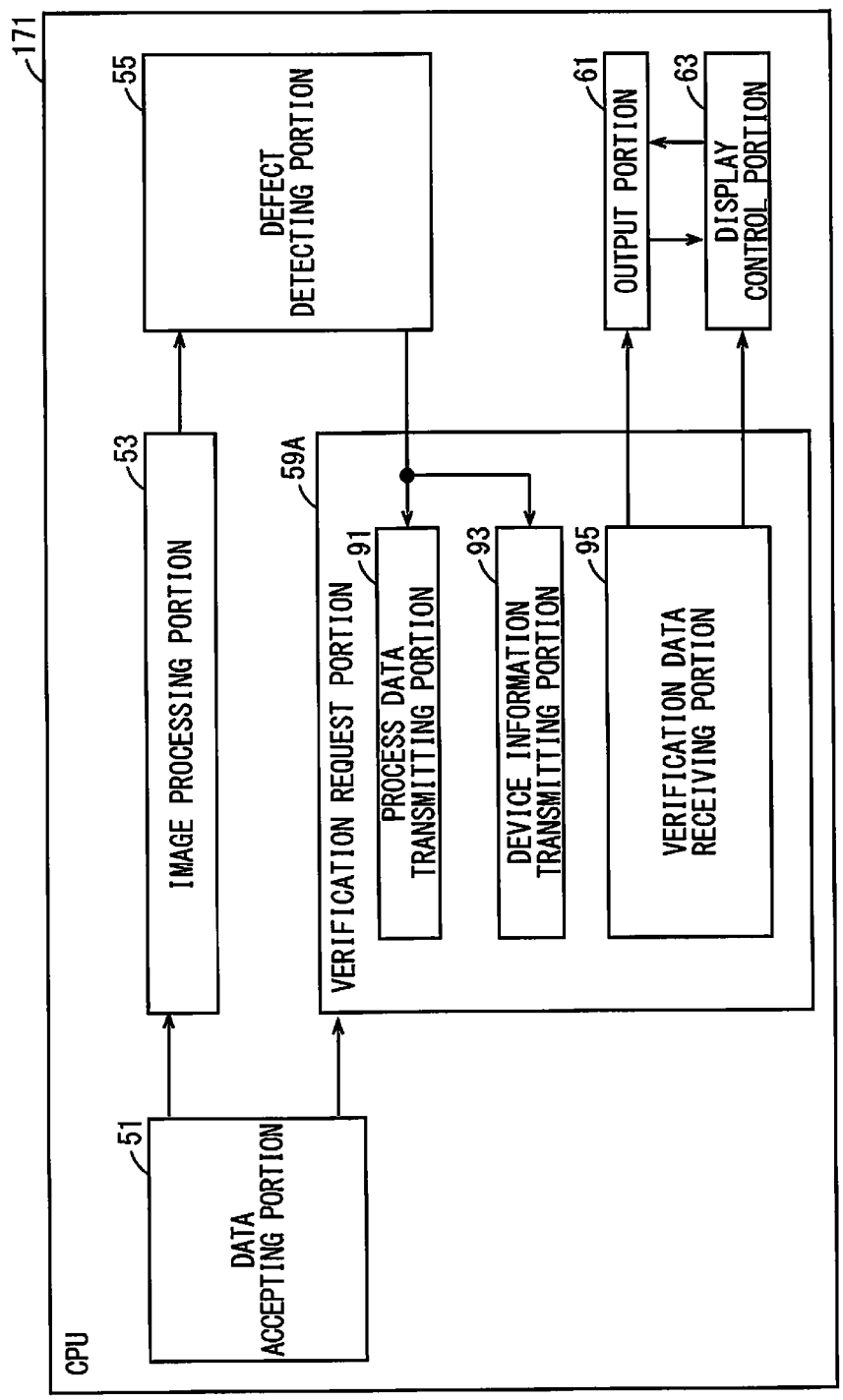
FIG. 14 is a block diagram showing one example of functions of a CPU included in an MFP in one or more embodiments.

FIG. 14 is a block diagram showing one example of functions of the CPU included in the MFP in one or more embodiments. The functions shown in FIG. 14 are implemented by the CPU 171 when the CPU 171 included in the MFP 100 executes a device-side image control program stored in the ROM 173, the HDD 113 or the CD-ROM 181. The device-side image control program is part of an image control program. Referring to FIG. 14, a difference from the functions shown in FIG. 4 is that the producing portion 59 is changed to a verification requesting portion 59A. The other functions are the same as the functions shown in FIG. 4. A description therefore will not be repeated.

The verification request portion 59A receives process data from the data accepting portion 51. The verification request portion 59A includes a process data transmitting portion 91, a device information transmitting portion 93 and a verification data receiving portion 95. In response to reception of defect information from the defect detecting portion 55, the process data transmitting portion 91 controls the communication I/F unit 160 to transmit the process data and the defect information to the internal server 200. In response to reception of the defect information from the defect detecting portion 55, the device information transmitting portion 93 produces the device information, and controls the communication I/F unit 160 to transmit the produced device information to the internal server 200. The device information includes the information relating to the CPU 171 provided in the MFP 100, the hardware information relating to the hardware resources installed in the MFP 100, and the software information relating to the software resources installed in the MFP 100. The information relating to the CPU 171 includes a model name of the CPU 171. The hardware information includes the hardware identification information for identifying the hardware resources and hardware parameters that are set to control the hardware resources. In the case where there are a plurality of hardware resources, the hardware information includes hardware identification information and hardware parameters for each of the plurality of hardware resources. The software information includes the name of the program installed in the MFP 100 and software parameters set for execution of the program.

After the process data transmitting portion 91 transmits the process data and the defect information to the internal server 200, the internal server 200 may return the verification data. In the case where the communication I/F unit 160 receives the verification data from the internal server 200, the verification data receiving portion 95 acquires the verification data and outputs the verification data to the output portion 61 and the display control portion 63.

Figure 15:
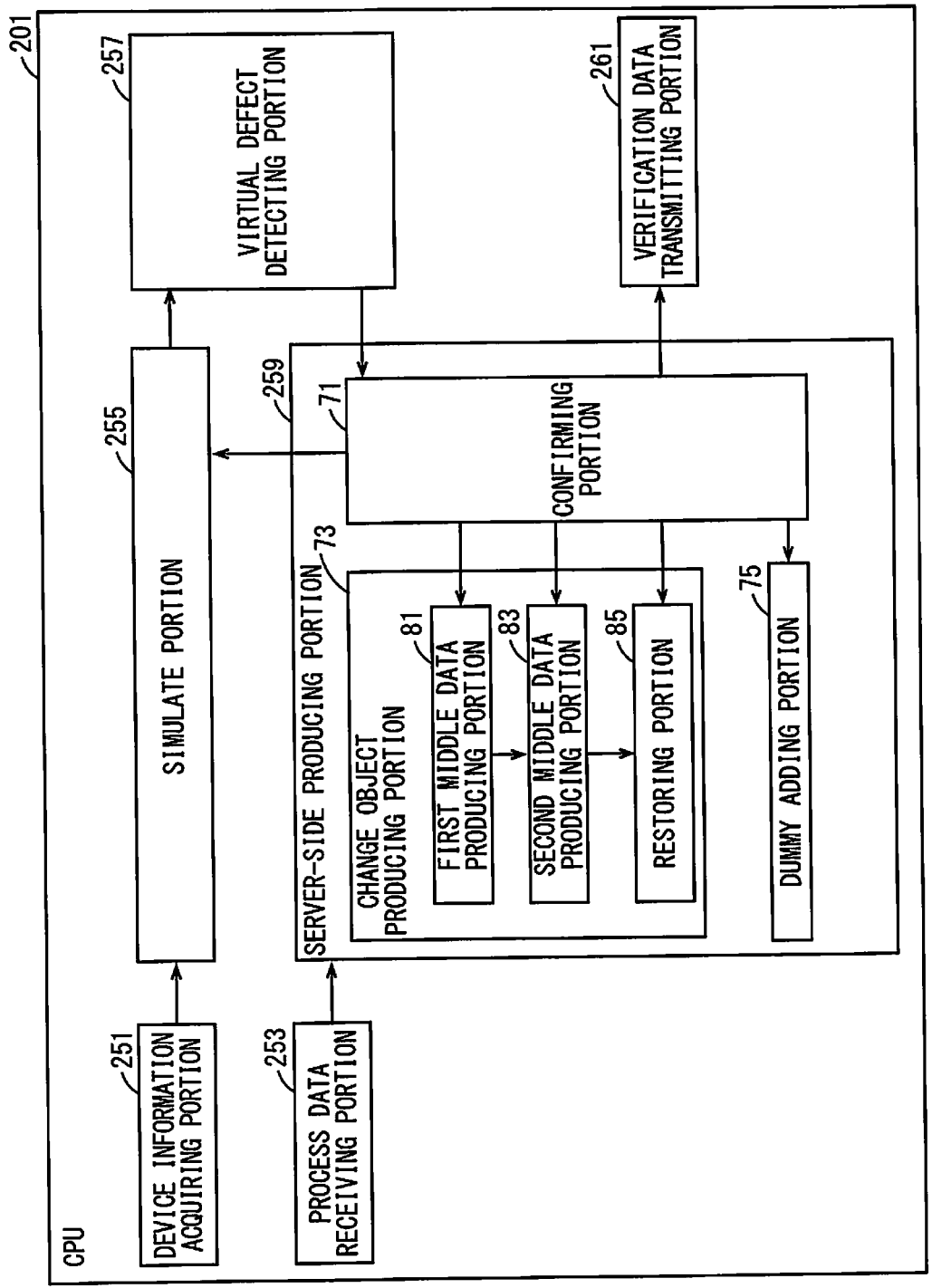
FIG. 15 is a block diagram showing one example of functions of a CPU included in the internal server in one or more embodiments.

FIG. 15 is a block diagram showing one example of functions of the CPU included in the internal server in one or more embodiments. The functions shown in FIG. 15 are implemented by the CPU 201 when the CPU 201 included in the internal server 200 executes a server-side image control program stored in the ROM 202, the HDD 204 or the CD-ROM 209. The server-side image control program is part of the image control program.

Referring to FIG. 15, the CPU 201 included in the internal server 200 includes a device information acquiring portion 251, a process data receiving portion 253, a simulate portion 255, a virtual defect detecting portion 257, a server-side producing portion 259 and a verification data transmitting portion 261.

The device information acquiring portion 251 acquires device information from the MFP 100. As described above, in the case where a defect is detected during the image process of the process data, the MFP 100 transmits the device information. When the communication unit 205 receives the device information from the MFP 100, the device information acquiring portion 251 acquires the device information received by the communication unit 205. In the case where acquiring the device information, the device information acquiring portion 251 outputs the device information to the simulate portion 255.

The process data receiving portion 253 acquires the process data and the defect information from the MFP 100. Because the MFP 100 transmits the process data and the defect information together with the device information, when the communication unit 205 receives the process data and the defect information from the MFP 100, the process data receiving portion 253 acquires the process data and the defect information, which the communication unit 205 has received. In the case where acquiring the process data and the defect information, the process data receiving portion 253 outputs the process data and the defect information to the server-side producing portion 259.

The simulate portion 255 simulates the MFP 100 based on the device information received from the device information acquiring portion 251, and performs the image process on the process data received from the process data receiving portion 253. First, the simulate portion 255 makes settings of the hardware resources provided in the MFP 100 based on the device information and then makes settings of hardware parameters.

The MFP 100 includes the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 as hardware resources. Therefore, the hardware information included in the device information defines the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 as the hardware resources. The simulate portion 255 makes settings of an emulator that emulates each of the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 that are defined by the hardware information included in the device information, and makes settings of the hardware parameters included in the hardware information. Further, the simulate portion 255 makes settings of synchronization of the virtual CPU 301 with the hardware resources to be emulated. For example, the simulate portion 255 allows the synchronization setting model 307 of the CPU peripheral simulator 300 shown in FIG. 13 to make settings of a register value of the virtual CPU 301 such that the virtual CPU 301 is synchronized with the emulator of the hardware resources, and rewrites a memory map of the virtual memory 303.

Further, the simulate portion 255 makes settings such that the software resources defined by the software information included in the device information are ready for the execution by the virtual CPU, and makes settings of the setting values included in the device information. Specifically, the simulate portion 255 installs the software resources defined by the software information included in the device information, and makes settings of the setting values included in the device information. Thus, in the simulate portion 255, the virtual device that is a result of simulation of the MFP 100 is completed. The data stored in the RAM 175 of the MFP 100 may be acquired as a snapshot, and may be stored in the virtual memory 303.

The virtual defect detecting portion 257 detects a defect that occurs during the image process performed by the simulate portion 255. The simulate portion 255 is an image process task formed when the virtual CPU 301 executes an image process program and an emulator that emulates the image control ASIC 177. In the case where the image process task detects an error that is predetermined by the image process program, or the case where the emulator of the image control ASIC 177 detects a predetermined error, the virtual defect detecting portion 257 detects a defect. The error predetermined by the image process program includes a timeout error meaning that a predetermined time length has elapsed since the start of the image process by the image process task. The predetermined time length may be proportional to a data amount of the data to be processed in the image process, for example. In the case where detecting a defect, the virtual defect detecting portion 257 outputs defect information for specifying the detected defect to the server-side producing portion 259. The defect information includes error identification information for identifying an error that is predetermined by the image process program.

Based on the process data received from the process data receiving portion 253, the server-side producing portion 259 produces the verification data that causes the same defect as the defect detected by the virtual defect detecting portion 257 when processed in the image process by the image process task. The server-side producing portion 259 includes a confirming portion 71, a change object producing portion 73 and a dummy adding portion 75. The confirming portion 71, the change object producing portion 73 and the dummy adding portion 75 are respectively the same as the confirming portion 71, the change object producing portion 73 and the dummy adding portion 75 that are shown as functions of the CPU 171 included in the MFP 100 in the previously-described embodiments in FIG. 4. A description therefore will not be repeated.

In response to reception of the verification data from the confirming portion 71, the verification data transmitting portion 261 controls the communication unit 205 to transmit the verification data to the MFP 100.

Figure 16:
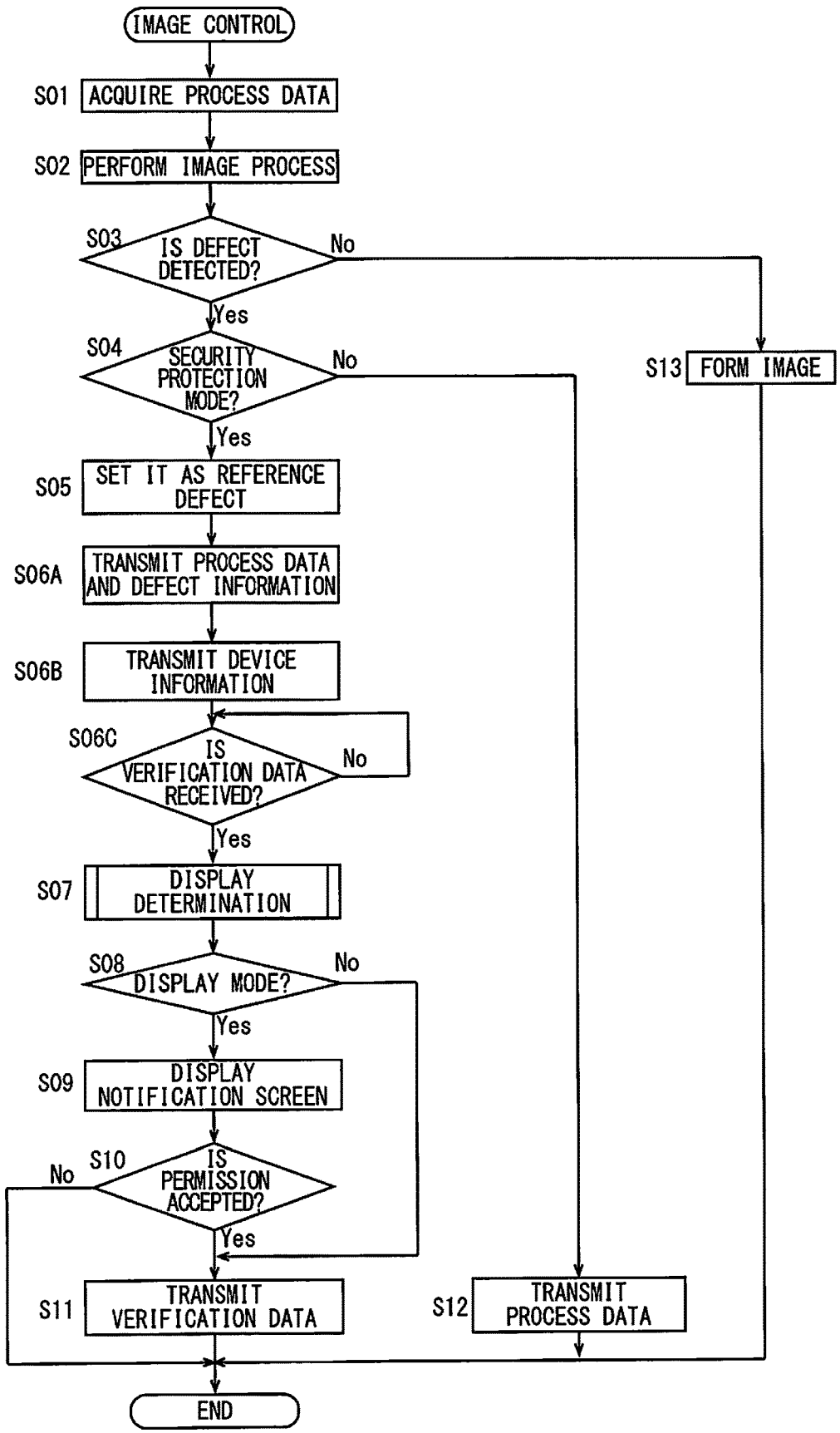
FIG. 16 is a flow chart showing one example of a flow of an image control process in one or more embodiments.

FIG. 16 is a flow chart showing one example of a flow of an image control process in one or more embodiments. Referring to FIG. 16, a difference from the image control process in the previously-described embodiments shown in FIG. 6 is that the step S06A to the step S06C are performed instead of the step S06. The other processes are the same as the processes shown in FIG. 6. A description therefore will not be repeated.

In the step S06A, the CPU 171 controls the communication I/F unit 160 to transmit the process data acquired in the step S01 and the reference defect information for specifying the reference detect set in the step S05 to the internal server 200. In the next step S06B, the CPU 171 controls the communication I/F unit 160 to transmit the device information to the internal server 200. In the next step S06C, the CPU 171 controls the communication I/F unit 160, and the process waits until the verification data is received from the internal server 200. If the verification data is received, the process proceeds to the step S07.

Figure 17:
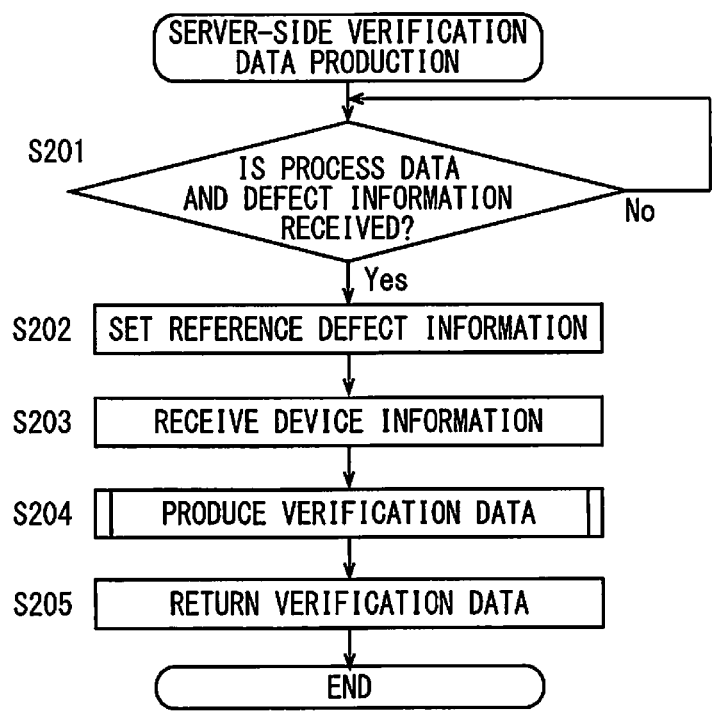
FIG. 17 is a flow chart showing one example of a flow of a server-side verification data production process.

FIG. 17 is a flow chart showing one example of a flow of a server-side verification data production process. The server-side verification data production process is performed by the CPU 201 when the CPU 201 included in the internal server 200 executes a server-side verification data production program. The server-side verification data production program is part of the confidential information conversion program. Referring to FIG. 17, the CPU 201 included in the internal server 200 controls the communication unit 205 and determines whether the process data and the defect information have been received from the MFP 100 (step S201). The process waits until the process data and the defect information are received (NO in the step S201). If the process data and the defect information are received (YES in the step S201), the process proceeds to the step S202.

In the step S202, the defect information received in the step S201 is set as the reference defect information, and the process proceeds to the step S203. In the step S203, the CPU 201 controls the communication unit 205 to receive the device information from the MFP 100. Then, the CPU 201 performs the verification data production process shown in FIG. 7 (step S203), and the process proceeds to the step S204. In the step S204, the CPU 201 controls the communication unit 205 to transmit the verification data to the MFP 100, and the process ends.

While simulating the MFP 100 as a whole in one or more embodiments, the internal server 200 may simulate the CPU 171 and the image control ASIC that are in charge of the image process in the MFP 100. Specifically, in FIG. 13, the peripheral model 305 is unnecessary, and the hardware resources model 325 is unnecessary in the HW simulator 320.

While the MFP 100 or the internal server 200 is shown as one example of the information processing apparatus in the above-mentioned embodiments, one or more embodiments of the present invention may of course be identified as an image control method for allowing the MFP 100 to perform the image control process shown in FIGS. 6 to 11, or an image control program for allowing the CPU 171 included in the MFP 100 to perform the image control method.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a central processing unit (CPU) that:
    detects a defect that occurs when an image process is performed on process data;
    produces verification data when at least a portion of the process data is changed and causes a same defect that occurs during the image process on the process data; and
    externally outputs the verification data instead of the process data, wherein:
the process data includes one or more objects, and is image data constituted by a plurality of pixel values;
the image process is a process of extracting the one or more objects from the process data, and converting the process data into data including the one or more extracted objects, and
the CPU:
    sets a partial image including at least a portion, that has caused an error during the image process, of the process data as an object, and
    produces data including at least a change object by changing at least one of a plurality of parameters defining the object to a random value.

2. The information processing apparatus according to claim 1, wherein the CPU:
    produces first middle data including at least the portion of the process data;
    produces second middle data by changing at least the portion included in the first middle data; and
    confirms an occurrence of a same defect that occurs during the image process on the process data.

3. The information processing apparatus according to claim 2, wherein the CPU:
    produces the first middle data by sequentially deleting a portion of the process data from the process data until right before no longer confirming an occurrence of the same defect that occurs during the image process on the process data;
    produces the second middle data by changing all of a plurality of parameters defining an object to random values for each of at least one object included in the first middle data;
    changes back at least one of the plurality of parameters of each of the at least one object included in the second middle data to an original value before a change; and
    sequentially changes back the plurality of parameters of each of the at least one object included in the second middle data to original values before a change until confirming the occurrence of the same defect that occurs during the image process on the process data.

4. The information processing apparatus according to claim 3, wherein the CPU changes back the plurality of parameters defining each of the at least one object included in the second middle data to original values before the change in a predetermined order.

5. The information processing apparatus according to claim 3, wherein the CPU, when an attribute of each of at least one object included in the first middle data indicates an image, changes a parameter indicating resolution or a size among the plurality of parameters defining the object to a smaller value.

6. The information processing apparatus according to claim 1, wherein the CPU further adds a dummy object unrelated to an object included in the verification data to the verification data.

7. The information processing apparatus according to claim 1, wherein the CPU, when a predetermined setting is made for the process data, produces the verification data.

8. The information processing apparatus according to claim 1, wherein:
the CPU produces data including at least a change object, which is at least one of the one or more objects included in the process data and is formed when at least one of a plurality of parameters defining the object is changed to a random value, as the verification data.

9. The information processing apparatus according to claim 1, wherein the CPU:
further displays an image of the verification data before externally outputting the verification data; and
does not externally output the verification data until accepting a user's input operation of permitting an output after the image of the verification data is displayed.

10. The information processing apparatus according to claim 9, wherein when a ratio of a number of at least one change object to a number of one or more objects included in the process data is smaller than a first threshold value, and/or when a ratio of a number of parameters that have been changed to a number of parameters defining the change object is larger than a second threshold value, the CPU does not display the image of the verification data.

11. The information processing apparatus according to claim 1, wherein the CPU:
further displays an image of the verification data before externally outputting the verification data; and
does not externally output the verification data until accepting a user's input operation of permitting an output after the image of the verification data is displayed.

12. The information processing apparatus according to claim 1, wherein the CPU:
acquires the process data from another information processing apparatus including a second CPU; and
simulates the second CPU.

13. An image control method including:
detecting a defect that occurs when an image process is performed on process data;
producing verification data at least a portion of the process data is changed and causes a same defect that occurs during the image process on the process data; and
externally outputting the verification data instead of the process data, wherein:
the process data includes one or more objects, and is image data constituted by a plurality of pixel values,
the image process is a process of extracting the one or more objects from the process data, and converting the process data into data including the one or more extracted objects, and
the method further includes:
setting a partial image including at least a portion, that has caused an error during the image process, of the process data as an object, and
producing data including at least a change object by changing at least one of a plurality of parameters defining the object to a random value.

14. A non-transitory computer-readable recording medium encoded with a device setting program, the device setting program allowing a computer to:
detect a defect that occurs when an image process is performed on process data;
produce verification data when at least a portion of the process data is changed and causes a same defect that occurs during the image process on the process data; and
externally output the verification data instead of the process data, wherein:
the process data includes one or more objects, and is image data constituted by a plurality of pixel values,
the image process is a process of extracting the one or more objects from the process data, and converting the process data into data including the one or more extracted objects, and
the device setting program further allows the computer to:
set a partial image including at least a portion, that has caused an error during the image process, of the process data as an object, and
produce data including at least a change object by changing at least one of a plurality of parameters defining the object to a random value.

15. An information processing apparatus comprising:
a central processing unit (CPU) that:
detects a defect that occurs when an image process is performed on process data;
produces verification data when at least a portion of the process data is changed and causes a same defect that occurs during the image process on the process data; and
externally outputs the verification data instead of the process data, wherein the CPU:
further displays an image of the verification data before externally outputting the verification data; and
does not externally output the verification data until accepting a user's input operation of permitting an output after the image of the verification data is displayed.

* * * * *